US010048912B2

(12) United States Patent
Kawamori

(10) Patent No.: US 10,048,912 B2
(45) Date of Patent: Aug. 14, 2018

(54) CONTROL DEVICE, CONTROL METHOD OF A CONTROL DEVICE, SERVER, AND NETWORK SYSTEM

(71) Applicant: Seiko Epson Corporation, Tokyo (JP)

(72) Inventor: Takashi Kawamori, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/374,414

(22) Filed: Dec. 9, 2016

(65) Prior Publication Data

US 2017/0168764 A1 Jun. 15, 2017

(30) Foreign Application Priority Data

Dec. 9, 2015 (JP) ................................. 2015-239926

(51) Int. Cl.
*G06F 3/12* (2006.01)

(52) U.S. Cl.
CPC .......... *G06F 3/1273* (2013.01); *G06F 3/1279* (2013.01); *G06F 3/1286* (2013.01)

(58) Field of Classification Search
CPC .... G06F 3/1203; G06F 3/1229; G06F 3/1236; G06F 3/1285; G06F 3/167; G06F 8/68; G06F 9/4406; G06F 9/4411; G06F 9/4446; G06F 9/45558; H04N 7/181; H04N 1/00344; H04N 1/00973; H04N 1/32523
USPC ........ 358/1.15; 709/222, 203; 359/567, 630; 455/406, 418, 419; 463/20; 700/275; 701/117; 705/44; 726/22
See application file for complete search history.

(56) References Cited

U.S. PATENT DOCUMENTS

| 6,571,285 | B1* | 5/2003 | Groath | H04L 41/0631 370/352 |
|---|---|---|---|---|
| 6,656,119 | B2* | 12/2003 | Sasaki | A61B 8/00 600/437 |
| 6,981,155 | B1* | 12/2005 | Lyle | G06F 21/53 703/21 |
| 8,073,932 | B2* | 12/2011 | Choi | G06Q 10/107 709/219 |
| 8,538,887 | B2* | 9/2013 | Yoshino | G06F 21/10 705/50 |
| 9,720,630 | B2* | 8/2017 | Kawamori | G06K 15/1805 |

(Continued)

FOREIGN PATENT DOCUMENTS

| JP | 2002-026921 A | 1/2002 |
|---|---|---|
| JP | 2002-305619 A | 10/2002 |

(Continued)

*Primary Examiner* — Negussie Worku
(74) *Attorney, Agent, or Firm* — Nutter McClennan & Fish LLP; John J. Penny, Jr.

(57) ABSTRACT

A control device executes a specific process at a specific time based on instruction from a server. A POS terminal connects through a network to a maintenance server that sends a response to a received request. The POS terminal has a log compiler that generates log data containing status information indicating a state of a monitored item targeted for monitoring; a communication manager that sends log data, generated by the log compiler, as a request to the maintenance server, and receives, as a response from the maintenance server, control data instructing executing a specific process at a scheduled time; a time monitor that monitors if the current time has reached the scheduled time; and a command executor configured to execute the specific process when the current time has reached the scheduled time.

13 Claims, 23 Drawing Sheets

(56) References Cited

U.S. PATENT DOCUMENTS

| | | | |
|---|---|---|---|
| 9,928,366 B2* | 3/2018 | Ladnai | G06F 21/56 |
| 2002/0029238 A1* | 3/2002 | Okuhata | G06F 9/4881 |
| | | | 718/101 |
| 2004/0148379 A1 | 7/2004 | Ogura | |
| 2004/0205262 A1* | 10/2004 | Ikeno | G03G 15/5079 |
| | | | 710/15 |
| 2004/0220999 A1* | 11/2004 | Kojima | H04L 12/2602 |
| | | | 709/201 |
| 2005/0268172 A1* | 12/2005 | Uchinomiya | G06F 11/3476 |
| | | | 714/37 |
| 2007/0033069 A1* | 2/2007 | Rao | A63B 24/00 |
| | | | 705/2 |
| 2007/0041031 A1* | 2/2007 | Kaneko | G06F 3/1222 |
| | | | 358/1.14 |
| 2008/0140675 A1* | 6/2008 | Saito | G03G 21/04 |
| 2008/0140831 A1* | 6/2008 | Kawana | H04L 41/00 |
| | | | 709/224 |
| 2009/0109477 A1* | 4/2009 | Oomura | G06F 3/1222 |
| | | | 358/1.15 |
| 2011/0138036 A1* | 6/2011 | Tyree | H04L 41/0226 |
| | | | 709/224 |
| 2011/0235108 A1* | 9/2011 | Kato | G06F 3/1218 |
| | | | 358/1.15 |
| 2013/0086243 A1* | 4/2013 | Cho | H04L 12/2807 |
| | | | 709/223 |
| 2014/0268226 A1* | 9/2014 | Yoshida | G06F 11/0733 |
| | | | 358/1.15 |
| 2014/0355051 A1* | 12/2014 | Nakajima | H04N 1/00344 |
| | | | 358/1.15 |
| 2015/0094968 A1* | 4/2015 | Jia | G06Q 40/04 |
| | | | 702/60 |
| 2015/0153808 A1* | 6/2015 | Nakai | G06F 1/3209 |
| | | | 358/1.14 |
| 2016/0063508 A1* | 3/2016 | Fukushima | G06Q 30/016 |
| | | | 705/304 |
| 2016/0337167 A1* | 11/2016 | Kawato | H04L 41/069 |
| 2016/0380852 A1* | 12/2016 | Kawamori | G06F 8/61 |
| | | | 709/224 |
| 2017/0123975 A1* | 5/2017 | Tseng | G06F 3/0608 |
| 2017/0168764 A1* | 6/2017 | Kawamori | G06F 3/1273 |
| 2017/0270722 A1* | 9/2017 | Tse | G07C 9/00103 |

FOREIGN PATENT DOCUMENTS

| | | |
|---|---|---|
| JP | 2003-271238 A | 9/2003 |
| JP | 2004-139572 A | 5/2004 |
| JP | 2014-191508 A | 10/2014 |

\* cited by examiner

212

| PRINTER IDENTIFIER | CPU ERROR | PRINTHEAD ERROR | CUTTER ERROR | MEMORY ERROR |
|---|---|---|---|---|
| A0001 | NO | NO | NO | YES |
| A0002 | YES | YES | NO | NO |
| A0003 | NO | NO | YES | NO |
| A0004 | NO | NO | NO | YES |

| EVENT SCHEDULE IDENTIFIER | CONTROL DEVICE IDENTIFIER | SCHEDULED TIME | COMMAND INFORMATION | PROGRESS STATUS INFORMATION | PROCESS RESULT CONTENT INFORMATION |
|---|---|---|---|---|---|

FIG. 12

CONTROL DEVICE, CONTROL METHOD OF A CONTROL DEVICE, SERVER, AND NETWORK SYSTEM

CROSS-REFERENCE TO RELATED APPLICATIONS

This application claims priority under 35 U.S.C. § 119 to Japanese Patent Application No. 2015-239926 filed on Dec. 9, 2016, the entire disclosure of which is expressly incorporated by reference herein.

BACKGROUND

1. Technical Field

The present invention relates to a control device, a control method of a control device, a server, and a network system.

2. Related Art

A network system (remote maintenance system) in which log data (monitor log and error log) is sent from a control device (client; a customer device being monitored) to a server (a monitoring server) is described in JP-A-2003-271238, for example.

In a network system having a server and a control device that is a client of the server connected over a network as described in JP-A-2003-271238, the server and control device exchange data by the control device sending a request to the server and the server returning a response to the request to the control device. For the server to control the control device to run a specific process at a specific time in such a network system, the server sends control data instructing executing the specific process as a response to a request received at a time near the specific time for running the specific process. In this event, however, a time lag may result between the specific time and the time when the control device actually runs the specific process due, for example, to a difference between the time when the control device sends the request and the specific time for running the process.

SUMMARY

An object of the invention is provide a control device that sends a request to and receives a response from a server, a control method of the control device, a server that can connect to the control device, and a network system having the control device and the server whereby the control device can be controlled by a command from the server to execute a specific process at a specific time.

To achieve the foregoing objective, an aspect of the invention is a control device that connects through a network to a server, which sends a response to a received request. The control device has a log compiler that generates log data containing status information indicating a state of a monitored item targeted for monitoring; a communication manager that sends the log data, generated by the log compiler, as a request to the server, and receives, as a response from the server, control data instructing executing a specific process at a scheduled time; a time monitor that monitors if the current time has reached the scheduled time; and a command executor that executes the specific process when the current time has reached the scheduled time.

Based on control data received from the server, the control device runs the specific process, by functions of the time monitor and command executor, when the current time has reached scheduled time. The control device can therefore execute a specific process at a specific time as instructed by the server.

In an aspect of the invention, the log compiler generates the log data including information indicating a process result when the command executor executes the specific process.

When the specific process is executed at the scheduled time, the control device can report the process result to the server by transmitting the log data.

A control method of a control device that connects through a network to a server, which sends a response to a received request. The control method includes generating log data containing status information indicating a state of a monitored item targeted for monitoring; sending the log data, generated by the log compiler, as a request to the server, and receiving, as a response from the server, control data instructing executing a specific process at a scheduled time; monitoring if the current time has reached the scheduled time; and executing the specific process when the current time has reached the scheduled time.

Based on control data received from the server, the control device runs the specific process, by functions of the time monitor and command executor, when the current time has reached scheduled time. The control device can therefore execute a specific process at a specific time as instructed by the server.

Another aspect of the invention is a server that connects through a network to a control device, which sends a request to the server. The server has a request receiver that receives, as a request, log data that is generated and sent by the control device, and contains status information indicating a state of a monitored item targeted for monitoring; a response transmitter that sends to the control device, as a response to the request, control data including a scheduled time and instructing the control device to execute a specific process at the scheduled time; and a setting unit that sets the scheduled time.

The server in this configuration can cause the control device to run a specific process at a specific time by sending, to the control device, control data as a response to the log data.

In another aspect of the invention, the setting unit provides a user interface for receiving input of information related to the scheduled time and information related to the specific process; and sets the scheduled time based on input to the user interface.

This configuration enables the user to easily set, using the user interface, the scheduled time.

In another aspect of the invention the information related to the scheduled time includes information indicating the time zone of the location where information is input to the user interface; and the setting unit, based on the time zone information input to the user interface, sets the scheduled time to reflect the time difference between the location of the control device and the location where information is input to the user interface.

This configuration enables the user to appropriately set, by the setting unit, a scheduled time reflecting the time difference, even if the time difference between the location of the control device and the location of data input to the user interface is not known.

In another aspect of the invention, the setting unit receives the log data containing information indicating a process result of the specific process from the control device, and manages the state of progress of the specific process based on information contained in the received log data.

The server in this configuration can manage, based on log data received from the control device, the state of progress of the control device executing the specific process.

Another aspect of the invention is a network system including a control device, and a server that connects to the control device through a network. The control device has a log compiler that generates log data containing status information indicating a state of a monitored item targeted for monitoring; a communication manager that sends the log data, generated by the log compiler, as a request to the server, and receives, as a response from the server, control data instructing executing a specific process at a scheduled time; a time monitor that monitors if the current time has reached the scheduled time; and a command executor that executes the specific process when the current time has reached the scheduled time. The server has a request receiver that receives the log data from the control device as a request; a response transmitter that sends, to the control device, control data as a response to the request; and a setting unit that sets the scheduled time.

This configuration enables the control device to execute a specific process at a scheduled time as instructed by the server.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 8 illustrates the data structure of an error database.

FIG. 12 shows an example of a command storage database.

DESCRIPTION OF EMBODIMENTS

A preferred embodiment of the present invention is described below with reference to the accompanying figures.

Figure 1:
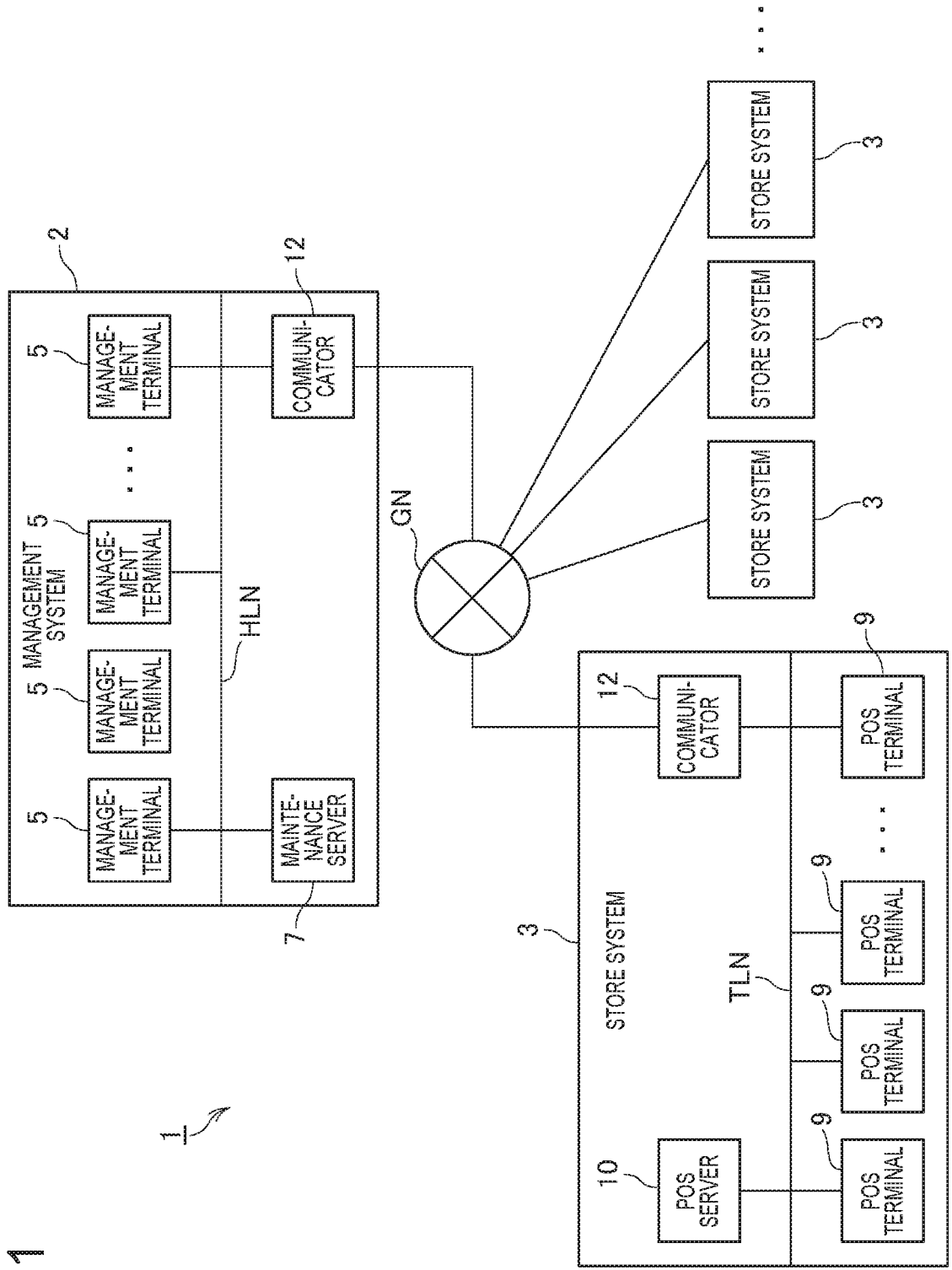
FIG. 1 illustrates the configuration of a network system according to an embodiment of the invention.

FIG. 1 illustrates the configuration of a network system 1 according to this embodiment of the invention. As shown in FIG. 1, the network system 1 includes a management system 2 and multiple store systems 3. The management system 2 and each of the store systems 3 are communicatively connected through a global network GN comprising the Internet or other networks.

The management system 2 is a system used by a service provider that provides maintenance of the POS terminals 9 (control devices) in a store system 3.

The store system 3 is a system used by a company that manages stores, such as supermarkets, convenience stores, department stores, or restaurants, that provide products or services and process transactions according to the provided product or service.

Note that the entities using the management system 2 and store system 3 need not be the same. If a single entity operates both systems, the management system 2 may be located, for example, in the headquarters of the company using the store system 3.

As shown in FIG. 1, the management system 2 has a management-side local area network HLN, which is a local network on the management side. Connected to the management-side local area network HLN are one or more management terminals 5, a maintenance server 7 (server), and communicator 12.

The communication protocol on the management-side local area network HLN may be any desirable protocol, and communication through the local area network may be by wired communication or wireless communication.

The management terminal 5 is a computer used by a management system 2 operator (referred to below as the maintenance technician) responsible for maintaining the POS terminals 9 of the store system 3.

The maintenance server 7 in the management system 2 is a server that communicates with the POS terminals 9 described below and manages the status of the POS terminals 9.

The management terminal 5 and maintenance server 7 can communicate through the management-side local area network HLN.

The configuration, function, and processes based on the functions of the management terminals 5 and maintenance server 7 are described further below.

The communicator 12 is an interface device that connects a local area network such as the management-side local area network HLN or a store-side local area network TLN described further below to the global network GN. The communicator 12 functions include a modem (or ONU (Optical Network Unit)), a router, a NAT (Network Address Translation), and DHCP (Dynamic Host Configuration Protocol) server, for example.

The communicator 12 relays data that is exchanged between devices when a device connected to a local area network and a device connected to the global network GN communicate. Note that in FIG. 1 the communicator 12 is represented by a single block, but the communicator 12 may comprise multiple devices with specific functions.

The maintenance server 7 of the management system 2 uses functions of the communicator 12 to communicate with the POS terminals 9 (described below) through the management-side local area network HLN, global network GN, and the store-side local area network TLN described below.

The store system 3 is a system used in a store.

As shown in FIG. 1, the store system 3 has a store-side local area network TLN, that is, a local area network deployed in the store. One or more POS terminals 9, a POS server 10, and communicator 12 connect to the store-side local area network TLN.

The communication protocol used on the store-side local area network TLN may be any desirable protocol, and communication through the local area network may be by wired communication or wireless communication.

The POS terminal 9 is a device with printing capability. The POS terminal 9 is disposed at a checkout counter where customer transactions are processed in the store. As described below, the POS terminal 9 can also transmit information related to the status of the POS terminal 9 to the maintenance server 7.

The POS server 10 is a server that communicates with the POS terminal 9 and controls the POS terminal 9. As described further below, in the store system 3, the POS terminal 9 communicates with the POS server 10 to execute a transaction process when processing a transaction at the checkout counter, and produces a receipt based on the transaction process. The receipt produced by the POS terminal 9 is then given by the checkout clerk to the customer.

In the store system 3, POS terminal 9 and POS server 10 can communicate through the store-side local area network TLN.

A POS terminal 9 of the store system 3 uses functions of the communicator 12 to communicate with the maintenance server 7 through the store-side local area network TLN, global network GN, and management-side local area network HLN.

The configuration, functions, and processes based on those functions to the POS terminal 9 and POS server 10 are described further below.

Note that in FIG. 1 the maintenance server 7 and POS server 10 are represented by single function blocks, but this does not mean the servers are configured by single server devices. For example, the maintenance server 7 and POS server 10 may be configured to include multiple server devices.

The maintenance server 7 and POS terminal 9 communicate securely by using a virtual private network (VPN) or other type of encryption technology or virtual dedicated line (or physical dedicated line) technology.

Figure 2:
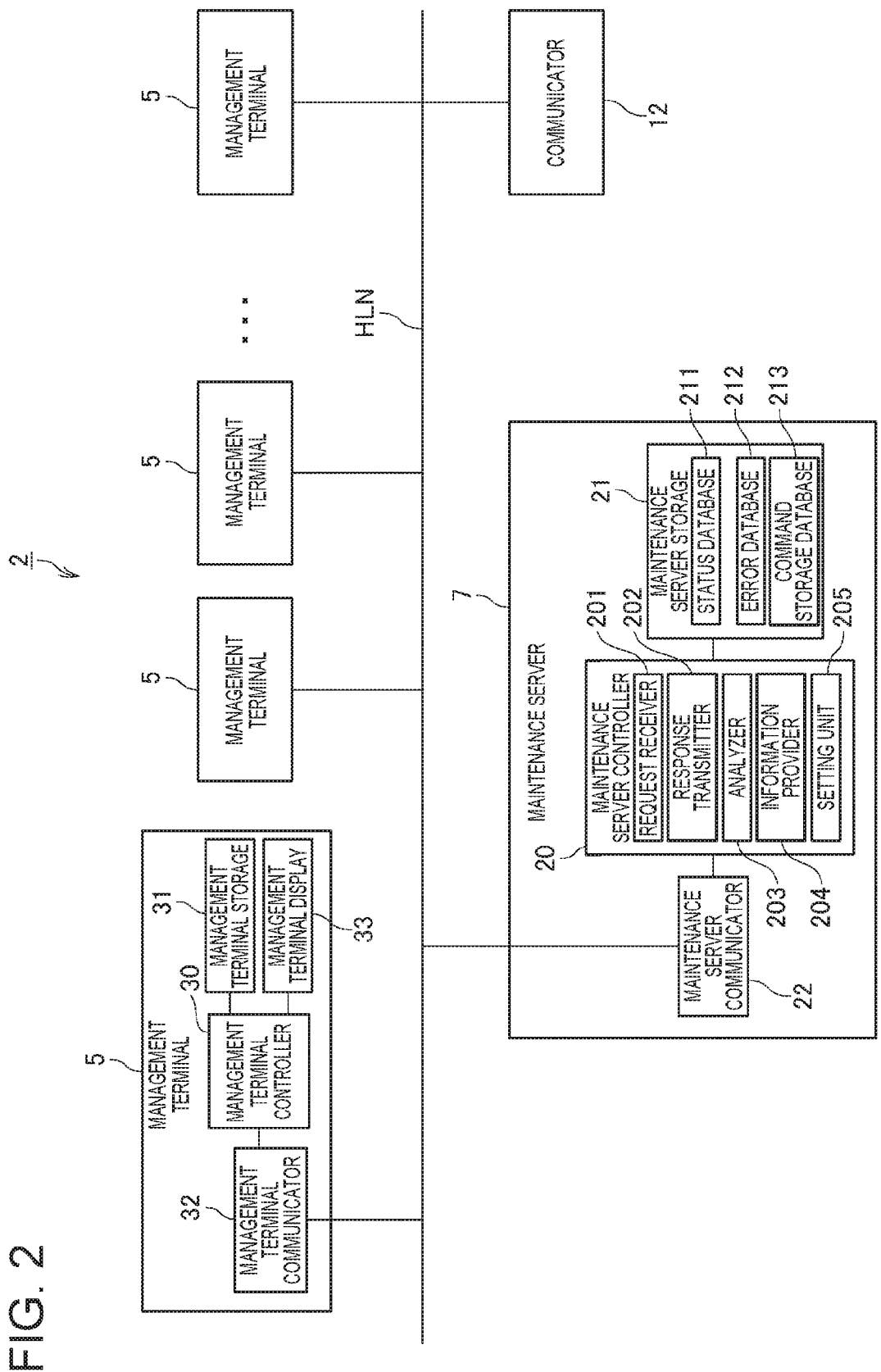
FIG. 2 is a block diagram illustrating the functional configuration of devices in the management system.

FIG. 2 is a block diagram illustrating the functional configuration of the maintenance server 7 and the management terminal 5 of the management system 2.

As shown in FIG. 2, the management terminal 5 has a management terminal controller 30, management terminal storage 31, management terminal communicator 32 and management terminal display 33. The management terminal controller 30 controls the management terminal 5. The management terminal storage 31 stores data. The management terminal communicator 32 communicates as controlled by the management terminal controller 30. The management terminal display 33 has an LCD display or other type of display device, and displays information as controlled by the management terminal controller 30.

A specific web browser is installed on the management terminal 5.

As shown in FIG. 2, the maintenance server 7 includes a maintenance server controller 20 (server controller), maintenance server storage 21, and maintenance server communicator 22.

The maintenance server controller 20 has a CPU, ROM, RAM, and other peripheral circuits not shown, and controls the maintenance server 7.

The maintenance server controller 20 has a request receiver 201, response transmitter 202, analyzer 203, information provider 204, and setting unit 205. These function blocks are embodied by the cooperation of hardware and software, such as a CPU reading and running a program (such as a dedicated program that runs on a specific server application). The functions and processes based on the functions of these function blocks are described further below.

The maintenance server storage 21 comprises nonvolatile storage such as a hard disk drive or an EEPROM device, and stores data (a status database 211, error database 212, and command storage database 213.

The maintenance server communicator 22 communicates with other devices (such as the management terminal 5) connected to the management-side local area network HLN through the management-side local area network HLN as controlled by the maintenance server controller 20.

The maintenance server communicator 22 also communicates with other devices (such as the POS terminals 9) connected to the global network GN as controlled by the maintenance server controller 20.

Figure 3:
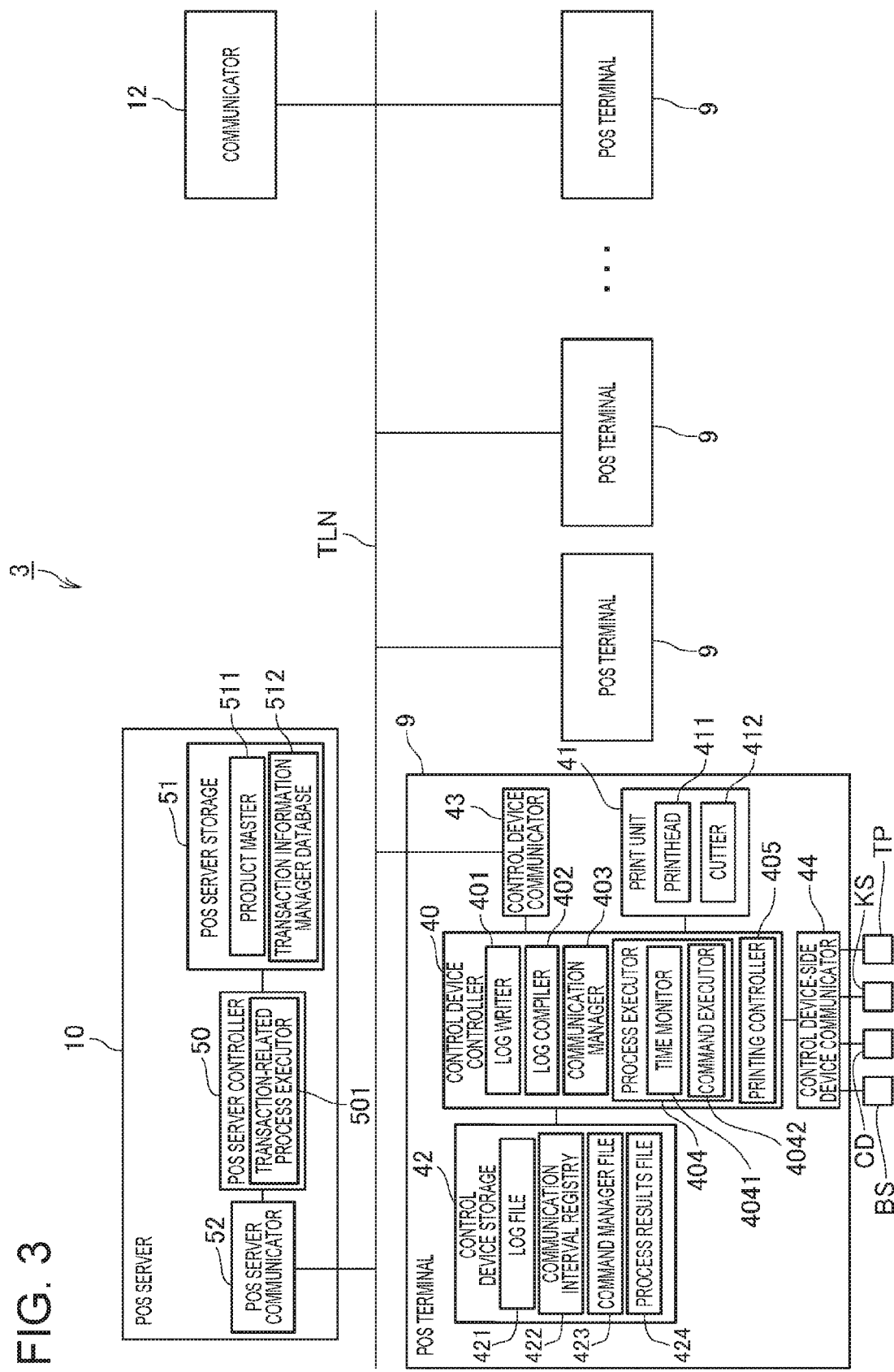
FIG. 3 is a block diagram illustrating the functional configuration of devices in a store system.

FIG. 3 is a block diagram of the functional configuration of the POS terminals 9 (control devices) and POS server 10 in the store system 3.

The POS terminal 9 (control device) is a thermal line printer that stores roll paper and prints images by forming dots with a thermal printhead on the roll paper.

As shown in FIG. 3, the POS terminal 9 has a control device control device controller 40 (controller), print unit 41, control device storage 42, control device communicator 43, control device-side device communicator 44, and control device-side device communicator 44.

The control device controller 40 (controller) includes a CPU, ROM, RAM, and other peripheral circuits not shown, and controls the POS terminal 9.

The control device controller 40 has a log writer 401, log compiler 402, communication manager 403, process executor 404, and printing controller 405.

The process executor 404 has a time monitor 4041 and command executor 4042. The function blocks are embodied by the cooperation of hardware and software, such as a CPU reading and running a program (such as firmware or a client application corresponding to the server software of the maintenance server 7). The functions and processes based on the functions of these function blocks are described further below.

In addition to a mechanism not shown for conveying roll paper stored inside the cabinet of the POS terminal 9, the print unit 41 has a printhead 411 and a cutter 412. The printhead 411 is a thermal line head disposed with multiple heat elements corresponding to the resolution arranged in a line in the direction transverse to the conveyance direction of the roll paper. The printhead 411 forms dots on the roll paper, which in this example is thermal roll paper, by heating selected heat elements. The cutter 412 has a fixed knife and a movable knife, and cuts the roll paper by moving the movable knife relatively to the fixed knife, causing the fixed knife and movable knife to cross and cut the roll paper between the knives. The print unit 41 prints receipt-related images on the roll paper with the printhead 411 while conveying the roll paper with the conveyance mechanism, and cuts the roll paper at a specific position by the cutter 412, as controlled by the printer controller 40, producing a receipt.

The control device storage 42 has nonvolatile memory, and stores data (log file 421, communication interval registry 422, command manager file 423, and process results file 424).

The control device communicator 43, as controlled by the control device controller 40, communicates through the store-side local area network TLN with other devices (including the POS server 10 and POS terminal 9) connected to the store-side local area network TLN.

The control device communicator 43, as controlled by the control device controller 40, also accesses the global network GN, and communicates with other devices (including the maintenance server 7) connected to the global network GN.

The control device-side device communicator 44 has an interface board with a USB port, a port conforming to a non-USB serial communication standard, or port conforming to another communication protocol. The control device-side device communicator 44 communicates with devices connected to the ports as controlled by the control device controller 40. Note that the control device-side device communicator 44 may have a wireless communication capability and be configured to communicate with devices wirelessly.

Figure 17:
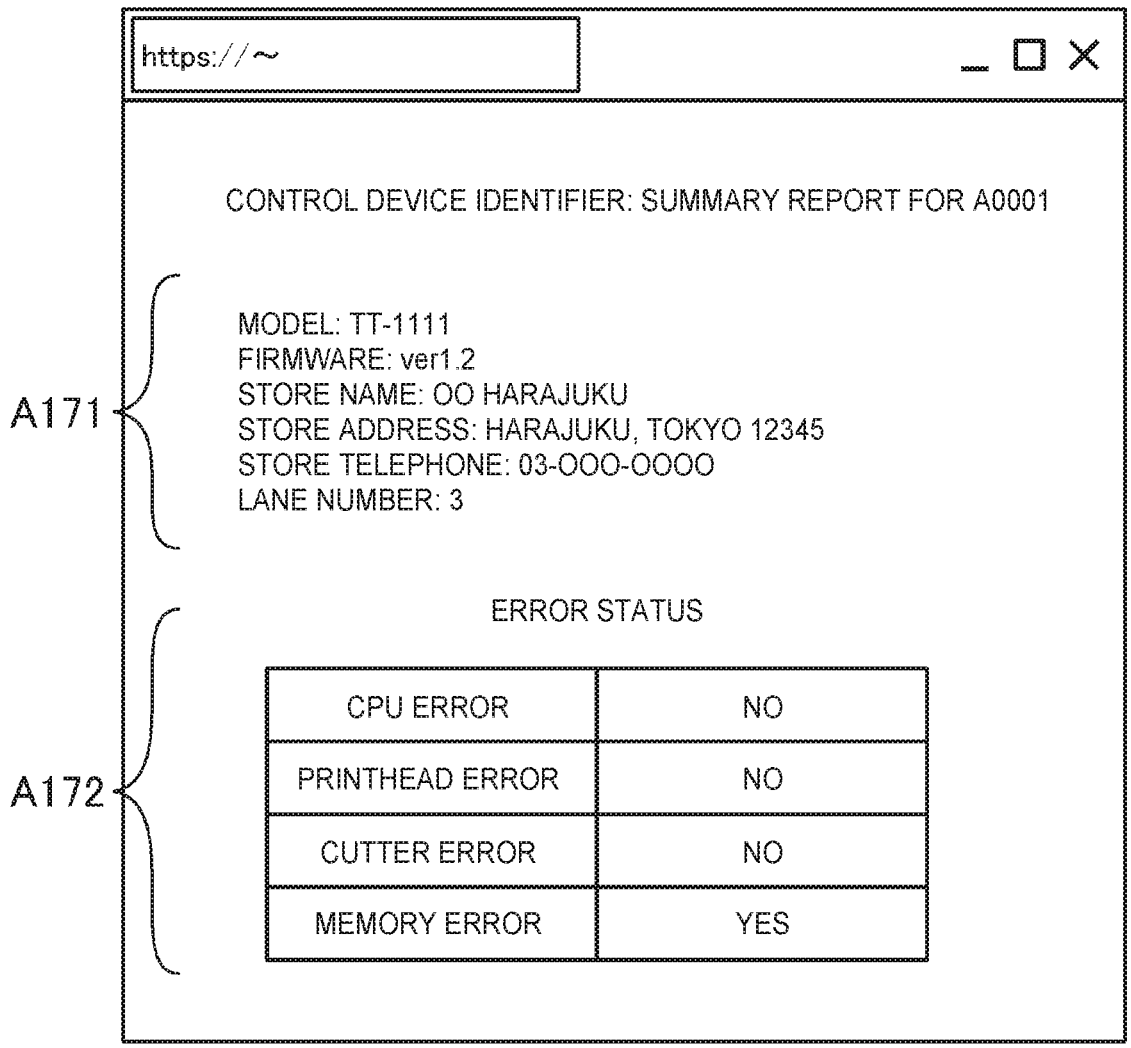
FIG. 17 shows an example of an information provider screen.

In the example shown in FIG. 17, a barcode scanner BS, customer display CD, cash drawer KS, and touch panel TP connect as peripheral devices to the POS terminal 9.

The barcode scanner BS reads barcodes from products and product packaging, and outputs data representing the read result to the control device-side device communicator 44. The control device-side device communicator 44 outputs the data input from the barcode scanner BS to the control device controller 40.

The customer display CD is an LCD display or other type of display device, and displays information as controlled by the control device controller 40. Information displayed on the customer display CD can be seen by the customer in the transaction at the checkout counter.

The cash drawer KS has a tray for holding money, mechanisms for locking and unlocking the tray, and a mechanism for kicking out the tray, and releases the lock and kicks out the tray as controlled by the control device controller 40.

The touch panel TP is an LCD panel, OLED panel, or other type of display panel with a touch sensor for detecting touch operations by the user (such as the checkout clerk) overlaid to the display panel. The touch panel TP is disposed at the checkout counter where it can be seen and operated by touch by the checkout clerk. The touchpanel TP displays information on the display panel as controlled by the control device controller 40. The control device controller 40 can display a web page on the touch panel TP based on an HTML file acquired by specific means. When a touch operation by the user is detected, the touch panel TP outputs a signal indicating the location that was touched to the control device controller 40. The control device controller 40 then executes a process corresponding to the touch operation by the user based on input from the touch panel TP.

As shown in FIG. 3, the POS server 10 has a POS server controller 50, POS server storage 51, and POS server communicator 52.

The POS server controller 50 includes a CPU, ROM, RAM, and other peripheral circuits not shown, and controls the POS server 10.

The POS server controller 50 has a transaction-related process executor 501. This function block executes processes by the cooperation of hardware and software, such as a CPU reading and running a program (such as a POS application). The functions of this function block and processes based on those functions are described further below.

The POS server storage 51 comprises nonvolatile storage such as a hard disk drive or an EEPROM device, and stores data.

The POS server storage 51 stores a product master 511. The product master 511 relationally stores product code, price, and other information about products sold in the store.

The POS server storage 51 also stores a transaction information manager database 512. The transaction information manager database 512 is described further below.

As described above, the network system 1 includes a maintenance server 7. The maintenance server 7 manages the status of POS terminals 9 in the store system 3.

The maintenance server 7 also provides information that is useful for POS terminal 9 maintenance to the maintenance technician described above.

The operation of devices in the network system 1 when managing the status of the POS terminals 9 is described below.

The POS terminal 9 and maintenance server 7 communicate according to HTTP (Hypertext Transfer Protocol). More specifically, the POS terminal 9 is an example of a client in a client-server system and the maintenance server 7 is a server in a client-server system. The POS terminal 9 sends an HTTP request (response request; request) to the maintenance server 7. As described below, the POS terminal 9 sends an HTTP request at a specific interval to the maintenance server 7. When an HTTP request is received, the maintenance server 7 sends a HTTP response (response) to the POS terminal 9.

As a result, data can be sent and received between the POS terminal 9 and maintenance server 7 by the POS terminal 9 sending a response request and the maintenance server 7 returning a response to the response request. Data can therefore not be transmitted asynchronously from the maintenance server 7 to a specific POS terminal 9, and data is sent from the maintenance server 7 to a specific POS terminal 9 in the form of data transmitted as a response to a response request from the specific POS terminal 9.

Figure 4:
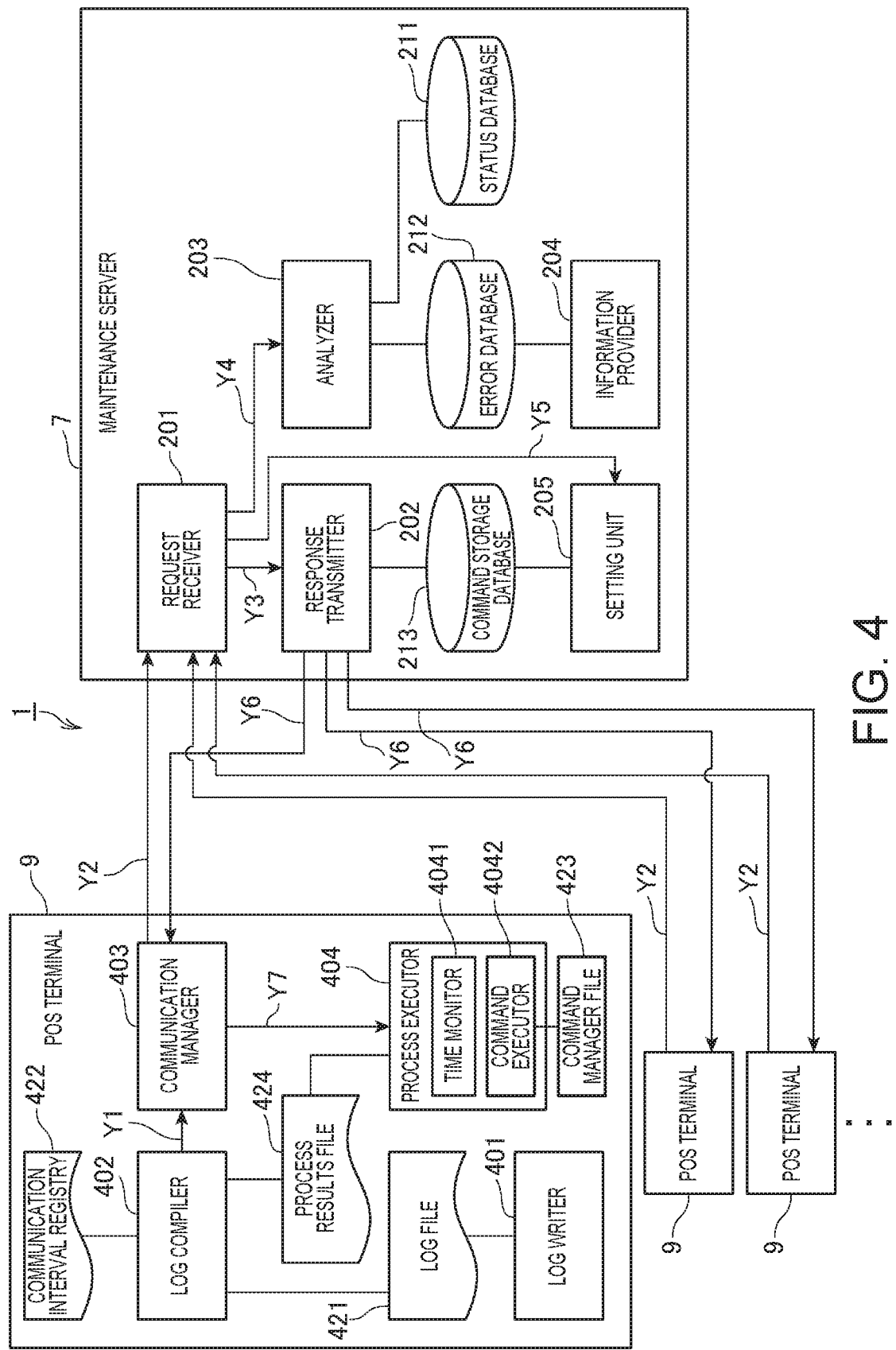
FIG. 4 illustrates the flow of data between devices in the network system.

FIG. 4 shows function blocks of the control device controller 40 of the POS terminal 9, and function blocks of the maintenance server controller 20 of the maintenance server 7 together with associated data.

The basic flow of data sent and received between the function blocks of the POS terminal 9 and maintenance server 7 for the maintenance server 7 to manage the status of a POS terminal 9 is described with reference to FIG. 4.

Note that details about the processes of the function blocks, and the content of data sent and received between the function blocks, are described further below and omitted from the description using FIG. 4.

As shown in FIG. 4, the log writer 401 of the POS terminal 9 writes log information to the log file 421 at specific times.

The log file 421 is a file containing multiple entries of log information.

The log information is a record (log) of monitored items. A log of multiple monitored items is recorded in the log file 421.

A monitored item is a state (condition) that is monitored for change, and is previously defined as an item to be monitored and logged. Examples of states that are monitored and logged in this embodiment of the invention include CPU temperature, the printhead replacement time, cutter replacement time, and memory replacement time.

Note that these are examples of monitored items in this embodiment of the invention, and other items may be logged in addition to the foregoing items or instead of one or more of the foregoing items. For example, other monitored items may include items related to devices connected to the POS terminal 9, items related to storage media (such as RAM usage), processes started, and communication (such as the data transfer rate).

To keep a log of the CPU temperature, information indicating the CPU temperature is recorded chronologically with information indicating the time (which herein includes the date and time).

The log writer 401 acquires the CPU temperature at a specific interval by a specific means, and writes a log of the detected CPU temperature in the log file 421.

To keep a log of the printhead replacement time, information indicating the printhead replacement time is recorded chronologically with information indicating the time.

The printhead replacement time is the time from the present until the printhead 411 should be replaced. The log writer 401 acquires the printhead replacement time by a specific means.

The log writer 401 acquires the printhead replacement time at a specific interval by a specific means (monitors the status of the printhead replacement time), and writes a log of the detected printhead replacement time in the log file 421.

To keep a log of the cutter replacement time, information indicating the cutter replacement time is recorded chronologically with information indicating the time.

The printhead replacement time is the tine from the present until the cutter 412 should be replaced. The log writer 401 acquires the cutter replacement time by a specific means.

The log writer 401 acquires the cutter replacement time at a specific interval by a specific means, and writes a log of the detected cutter replacement time in the log file 421.

To keep a log of the memory replacement time, information indicating the memory replacement time is recorded chronologically with information indicating the time.

The control device storage 42 of the POS terminal 9 in this example uses a SSD (solid state drive) as the storage device. The memory replacement time is the tine from the present until the control device storage 42 should be replaced. The log writer 401 acquires the memory replacement time by a specific means.

The log writer 401 acquires the memory replacement time at a specific interval by a specific means, and writes a log of the detected memory replacement time in the log file 421.

As shown in FIG. 4, the log compiler 402 of the POS terminal 9, referring to the communication interval registry 422, generates log data D1 at the interval in the communication interval registry 422 based on the log file 421 and process results file 424.

When log data D1 is generated, the log compiler 402 outputs the log data D1 to the communication manager 403 (arrow Y1).

The communication manager 403 acquires the log data D1 the log compiler 402 output, and sends the acquired log data D1 to the maintenance server 7 (arrow Y2).

As described above, the POS terminal 9 generates and transmits the log data D1 at the interval in the communication interval registry 422 by means of the log compiler 402 and communication manager 403.

The POS terminal 9 sends the log data D1 to the maintenance server 7 by HTTP as an HTTP request (response request; request).

As shown in FIG. 4, the request receiver 201 of the maintenance server 7 receives the log data D1. The request receiver 201 then outputs the log data D1 to the response transmitter 202 (arrow Y3). The request receiver 201 also outputs the received log data D1 to the analyzer 203 (arrow Y4).

When process result information is contained in the received log data D1, the request receiver 201 also outputs the process result information to the setting unit 205 (arrow Y5).

The response transmitter 202, based on the log data D1, references the command storage database 213 and generates response data D2. The response transmitter 202 then sends the response data D2 to the POS terminal 9 (arrow Y6). The response data D2 is transmitted by HTTP as a HTTP response.

The analyzer 203, based on the log data D1, then updates the status database 211 and error database 212.

The setting unit 205, based on the process result information, updates the command storage database 213.

Note that the information provider 204, based on the request, references the error database 212 updated by the analyzer 203, and reports information related to the status of the POS terminal 9.

As shown in FIG. 4, the communication manager 403 of the POS terminal 9 receives the response data D2.

The communication manager 403 then executes a process based on the received response data D2. Specifically, if a command execution instruction is included in the response data D2, the communication manager 403 outputs the command execution instruction to the process executor 404 (arrow Y7).

The process executor 404, using the command manager file 423, executes a process based on the command execution instruction input from the communication manager 403.

The process executor 404, as a result of running the process based on the command execution instruction, records process result information indicating the process result in the process results file 424.

As described above, data is sent and received between the POS terminal 9 and maintenance server 7 through a cycle of the POS terminal 9 periodically sending log data D1 to the maintenance server 7, and the maintenance server 7 returning response data.

Operation of the POS terminal 9 and maintenance server 7 when the maintenance server 7 manages the status of the POS terminal 9 is described next.

Figure 5:
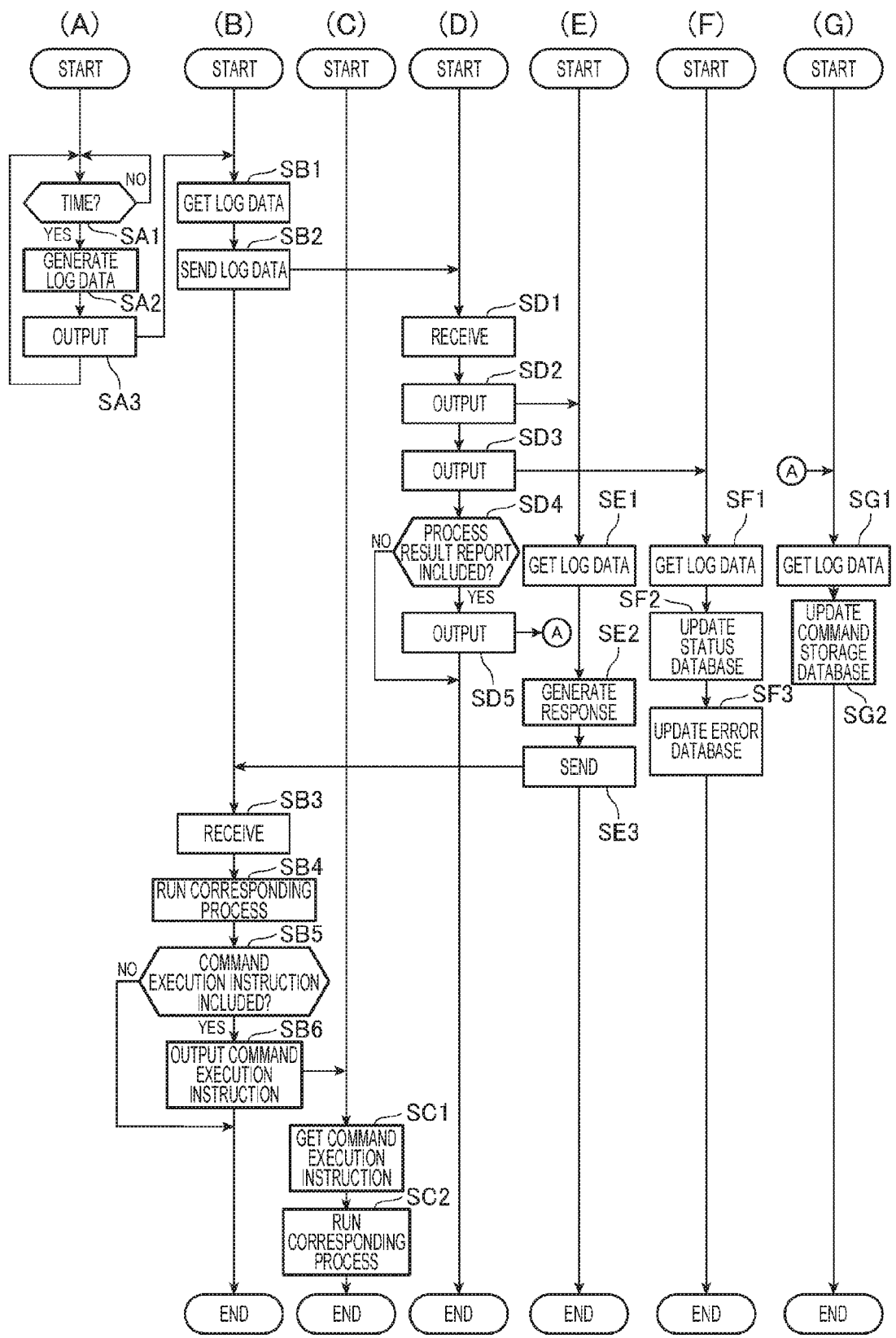
FIG. 5 is a flow chart of the operation of devices in the network system.

FIG. 5 is a flow chart of the operation of the POS terminal 9 and maintenance server 7.

Column (A) of FIG. 5 shows the operation of the log compiler 402 of the POS terminal 9, column (B) shows the operation of the communication manager 403 of the POS terminal 9, column (C) shows the operation of the process executor 404 of the POS terminal 9, column (D) shows the operation of the request receiver 201 of the maintenance server 7, column (E) shows the operation of the response transmitter 202 of the maintenance server 7, column (F)

shows the operation of the analyzer 203 of the maintenance server 7, and column (G) shows the operation of the setting unit 205 of the maintenance server 7.

As shown in column (A) of FIG. 5, the log compiler 402 of the POS terminal 9 references the communication interval registry 422 and monitors whether or not it is time to generate log data D1 (step SA1).

The communication interval registry 422 is a file recording information indicating the interval for generating the log data D1. In step SA1, the log compiler 402 references the communication interval registry 422, and, if the time indicated in the communication interval registry 422 has past since the last time log data D1 was generated, determines that it is time to generate the log data D1.

If it is time to generate the log data D1 (step SA1: YES), the log compiler 402 references the log file 421 and generates device status information based on the log information in the log file 421.

The log compiler 402 also references the process results file 424, and finds, in the process result information recorded in the process results file 424, the process result information that has not been sent to the maintenance server 7 (referred to below as unsent process result information). There may be no unsent process result information. The log compiler 402 then generates log data D1 based on the generated device status information and unsent process result information that was acquired (step SA2). The process result information is described further below.

The process of step SA2 is described next.

Figure 6:
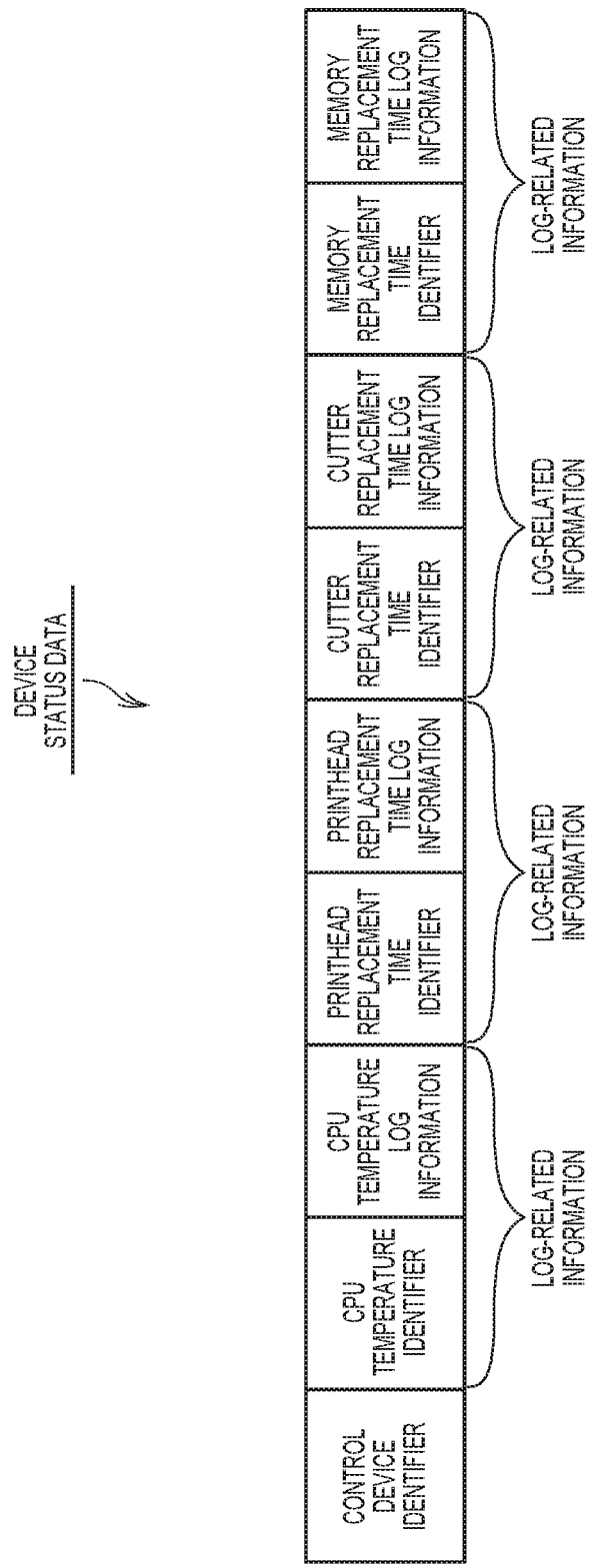
FIG. 6 illustrates information contained in device status information data.

FIG. 6 illustrates the data contained in the device status information.

As shown in FIG. 6, device status information contains a control device identifier. A control device identifier is information uniquely identifying a POS terminal 9. For example, the serial number of the POS terminal 9 (a number uniquely as signed to each POS terminal 9 when the POS terminal 9 is manufactured) may be used as the control device identifier.

Device status information also contains log-related information for each monitored item. More specifically, the device status information includes log-related information for the CPU temperature, printhead replacement time, cutter replacement time, and memory replacement time.

The log-related information contains an identifier identifying the monitored item, and log information, which is the information logged for that monitored item.

The log-related information of the CPU temperature contains an item identifier identifying the CPU temperature item (referred to below as the CPU temperature identifier), and log information for CPU temperature item (referred to below as the CPU temperature log information).

The log-related information of the printhead replacement time contains an item identifier identifying the printhead replacement time item (referred to below as the printhead replacement time identifier), and log information for the printhead replacement time item (referred to below as the printhead replacement time log information)

The log-related information of the cutter replacement time item contains an item identifier identifying the cutter replacement time item (referred to below as the cutter replacement time identifier), and log information for the cutter replacement time item (referred to below as the cutter replacement time log information).

The log-related information of the memory replacement time item contains an item identifying memory replacement time item (referred to below as the memory replacement time identifier), and log information for the memory replacement time item (referred to below as the memory replacement time log information).

In step SA2, the log compiler 402 generates device status information based on the log information in the log file 421.

The log data D1 is text data (such as XML (eXtensible Markup Language) data) recording information in a hierarchical structure of key and value pairs (in XML (Extensible Markup Language) or JSON format, for example) that can be sent to the maintenance server 7 as a request.

Figure 7:
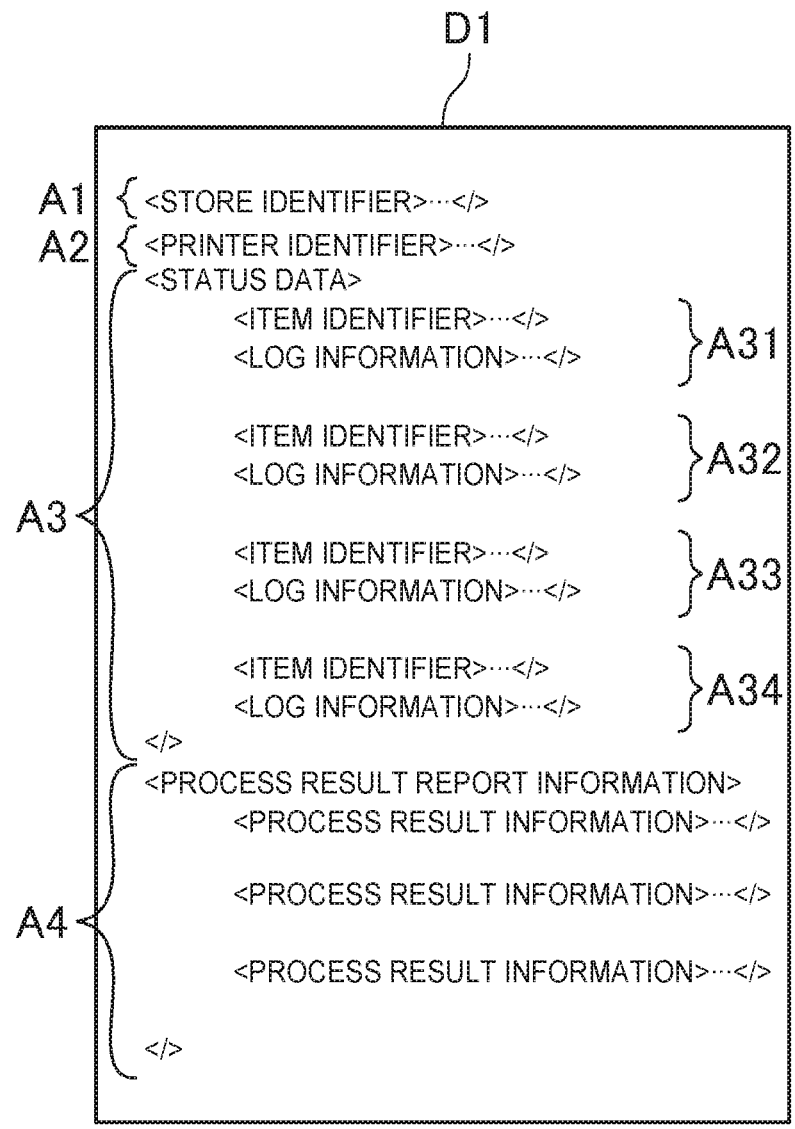
FIG. 7 shows an example of log data.

FIG. 7 shows an example of the content of the log data D1.

The log data D1 contains a store identifier identifying the store where the POS terminal 9 that generated the log data D1 is deployed. The store identifier is information uniquely identifying each store. The store identifier indicating the store where the POS terminal 9 is deployed is previously registered in each POS terminal 9. In the log data D1 shown for example in FIG. 7, the store identifier is written to line A1.

The log data D1 also contains a control device identifier identifying the POS terminal 9 that generated the log data D1. In the log data D1 shown for example in FIG. 7, the control device identifier is written to line A2.

The log data D1 also contains status information. In the log data D1 shown in the example in FIG. 7, the status information is recorded on lines A3.

The status information includes the item identifier and log information for each monitored item. In the log data D1 shown in the example in FIG. 7, the item identifier (CPU temperature identifier) and log information (CPU temperature log information) for the CPU temperature item are on lines A31. The item identifier (printhead replacement time identifier) and log information (printhead replacement time log information) for the printhead replacement time item are recorded on lines A32. The item identifier (cutter replacement time identifier) and log information (cutter replacement time log information) for the cutter replacement time item are recorded on lines A33 The item identifier (memory replacement time identifier) and log information (memory replacement time log information) for the memory replacement time item are recorded on lines A34.

The log data D1 also contains process result report information. The process result report information is recorded on lines A4 in the log data D1 shown in the example in FIG. 7.

The process result report information contains the unsent process result information. If there is no unsent process result information, process result report information is not recorded in the log data D1.

As described above, the log data D1 contains a store identifier, control device identifier, and status information. The status information contains the item identifier and log information of each monitored item. If there is any unsent process result information, the log data D1 also contains process result report information.

As shown in column (A) of FIG. 5, after generating log data D1 in step SA2, the log compiler 402 outputs the generated log data D1 to the communication manager 403 (step SA3). Next, the log compiler 402 goes to step SA1.

As shown in column (B) of FIG. 5, the communication manager 403 acquires the log data D1 the log compiler 402 output (step SB1).

Next, the communication manager 403 controls the control device communicator 43 to send the log data D1 acquired in step SB1 to the maintenance server 7 (step SB2).

In step SB2, the communication manager 403 sends, by HTTP, an HTTP request with the log data D1 in the request body to the maintenance server 7. Note that the URL of the maintenance server 7 to which to send the log data D1, the communication protocol, and other information required to send the log data D1 as a response request to the maintenance server 7 is previously registered in the POS terminal 9.

As shown in column (D) of FIG. 5, the request receiver 201 of the maintenance server 7 controls the maintenance server communicator 22 to receive the log data D1 (step SD1).

Next, the request receiver 201 outputs the received log data D1 to the response transmitter 202 (step SD2) and to the analyzer 203 (step SD3).

Next, the request receiver 201 determines if process result report information is contained in the received data (step SD4).

If there is process result report information (step SD4: YES), the request receiver 201 outputs the process result information contained in the process result report information (if there are multiple blocks of process result information in the process result report information, the multiple blocks of process result information) to the setting unit 205 (step SD5).

As shown in column (G) of FIG. 5, the setting unit 205 acquires the one or more blocks of process result information the request receiver 201 output (step SG1).

Next, the setting unit 205, based on the process result information acquired in step SG1, updates the command storage database 213 (step SG2). The process of step SG2 is described further below.

As shown in column (F) of FIG. 5, the analyzer 203 acquires the log data D1 the request receiver 201 output (step SF1).

Next, the analyzer 203 updates the status database 211 based on the acquired log data D1 (step SF2).

The status database 211 is a database with records for each POS terminal 9, and relationally stores the control device identifier, and the item identifier and log information of each monitored item, in each record.

In step SF2, the analyzer 203 finds the record of the POS terminal 9 that sent the log data D1 by comparing the control device identifier contained in the log data D1 with the control device identifiers contained in the records of the status database 211, and updates the content of the found record based on the log data D1. As a result, the record for the one POS terminal 9 in the status database 211 is updated to content based on the most recent log data D1 received from that POS terminal 9.

Next, the analyzer 203, based on the acquired log data D1, updates the error database 212 (step SF3). The process of step SF3 is described further below.

FIG. 8 illustrates the structure of the error database 212.

As shown in FIG. 8, each record in the error database 212 contains at least an control device identifier, CPU error information, printhead error information, cutter error information, and memory error information.

CPU error information is information indicating whether or not a CPU error occurred, and either indicates an error occurred (YES in FIG. 8) or did not occur (NO in FIG. 8). A CPU error occurs if the CPU temperature exceeds a specific value used to determine if that a CPU error may have occurred.

Printhead error information is information indicating whether or not a printhead error occurred, and either indicates an error occurred (YES in FIG. 8) or did not occur (NO in FIG. 8). A printhead error occurs if the printhead replacement time goes below a specific threshold.

Cutter error information is information indicating whether or not a cutter error occurred, and either indicates an error occurred (YES in FIG. 8) or did not occur (NO in FIG. 8). A cutter error occurs if the cutter replacement time goes below a specific threshold.

Memory error information is information indicating whether or not a memory error occurred, and either indicates an error occurred (YES in FIG. 8) or did not occur (NO in FIG. 8). A memory error occurs if the memory replacement time goes below a specific threshold.

Figure 9:
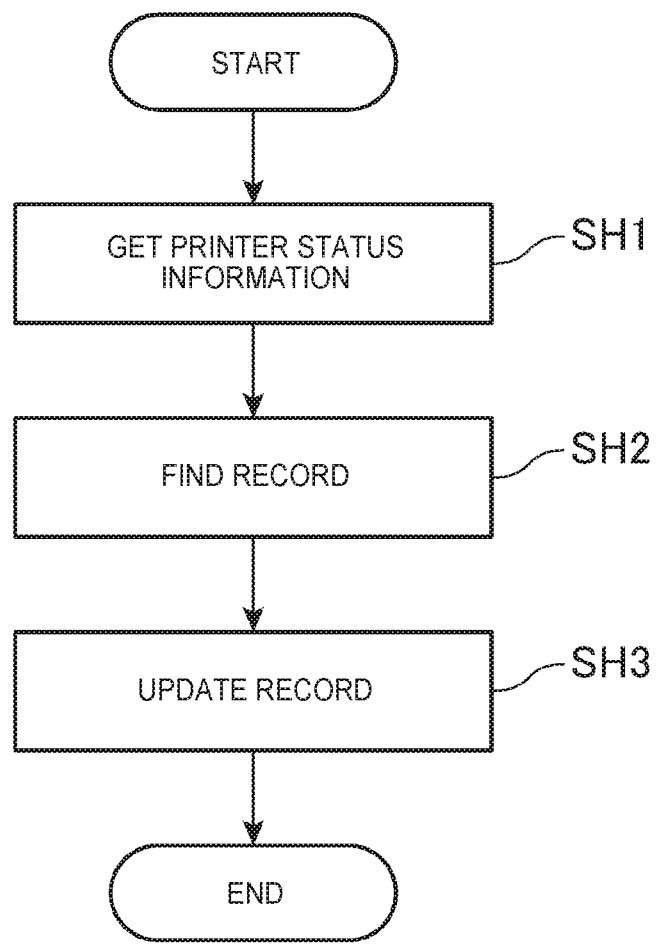
FIG. 9 is a flow chart of a POS terminal operation.

FIG. 9 is a flow chart of the process in step SF3.

As shown in FIG. 9, the analyzer 203 acquires the status information in the log data D1 (step SH1). As described above, a combination of the item identifier and log information for each monitored item is contained in the status information.

Next, the analyzer 203, by comparing the control device identifiers, finds the matching record in the error database 212 (finds the record with the same control device identifier as the control device identifier of the POS terminal 9 that sent the log data D1) (step SH2).

Next, the analyzer 203, based on the acquired status information, updates the CPU error information, printhead error information, cutter error information, and memory error information in the identified record (step SH3).

More specifically, the analyzer 203, based on the CPU temperature log information (log information) contained in the status information, determines if the CPU temperature exceeds the specific threshold; if it exceeds the specific threshold, sets the value of the CPU error information to the value indicating that a CPU error has occurred; and if it does not exceed the specific threshold, sets the value of the CPU error information to the value indicating that a CPU error has not occurred.

In addition, the analyzer 203, based on the printhead replacement time log information (log information) contained in the status information, determines if the printhead replacement time is below the specific threshold; if it is, sets the value of the printhead replacement time information to the value indicating that a printhead error has occurred; and if it does not, sets the value of the printhead replacement time information to the value indicating that a printhead error has not occurred.

In addition, the analyzer 203, based on the cutter replacement time log information (log information) contained in the status information, determines if the cutter replacement time is below the specific threshold; if it is, sets the value of the cutter replacement time information to the value indicating that a cutter error has occurred; and if it does not, sets the value of the cutter replacement time information to the value indicating that a cutter error has not occurred.

In addition, the analyzer 203, based on the memory replacement time log information (log information) contained in the status information, determines if the memory replacement time is below the specific threshold; if it is, sets the value of the memory replacement time information to the value indicating that a memory error has occurred; and if it does not, sets the value of the memory replacement time information to the value indicating that a memory error has not occurred.

As shown in column (E) of FIG. 5, the response transmitter 202 acquires the log data D1 the request receiver 201 output (step SE1).

Next, the response transmitter 202 generates response data D2 (step SE2).

The response data D2 contains at least received report information indicating that the log data D1 was received, and in specific cases also includes a command execution instruction.

The process of step SE2 is described below.

Figure 10:
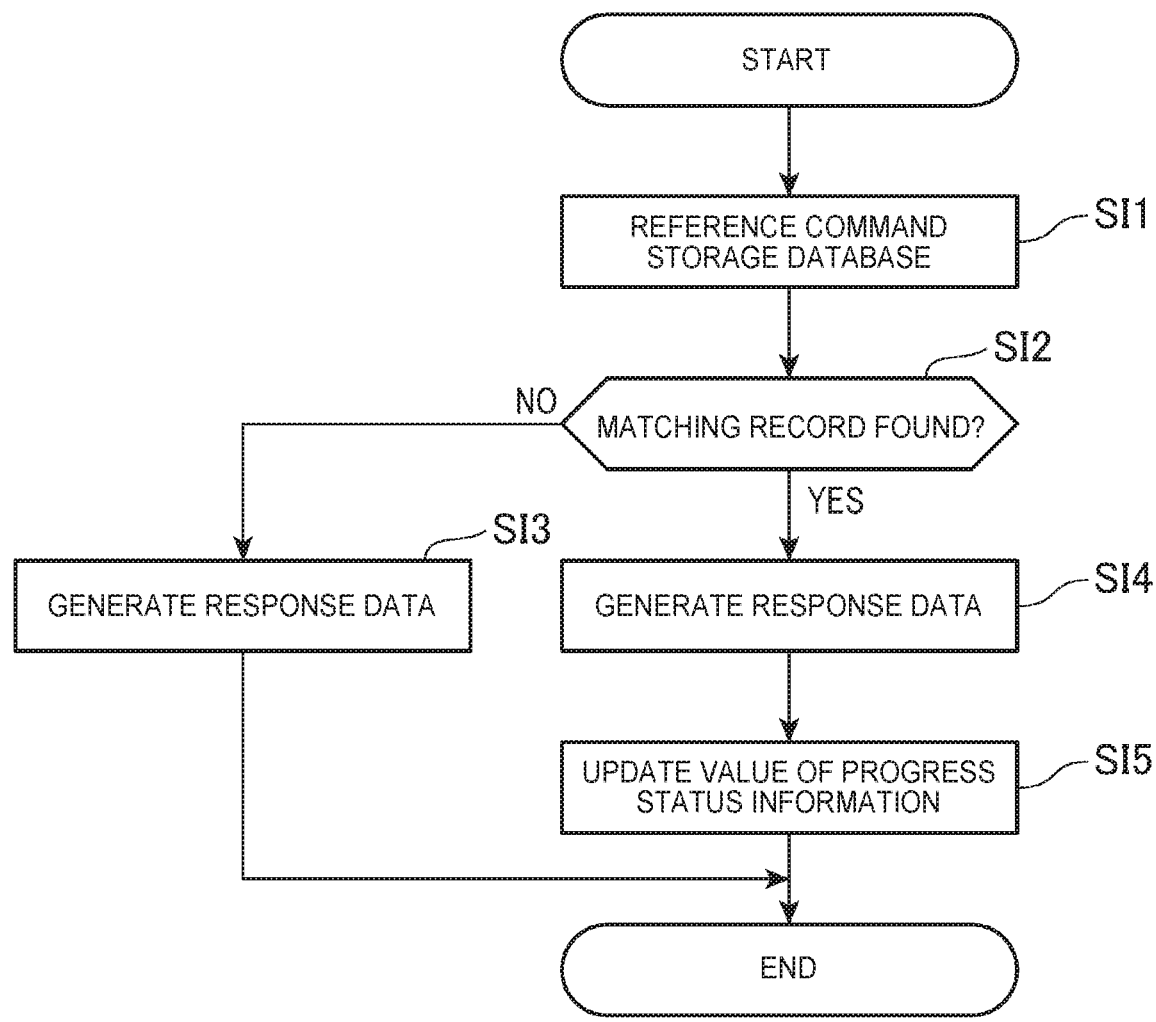
FIG. 10 is a flow chart of the operation of the maintenance server.

FIG. 10 is a flow chart of the process of the response transmitter 202 in step SE2.

As shown in FIG. 10, the response transmitter 202 references the command storage database 213 (step SI1).

The maintenance technician can, by registering a record in the command storage database 213 by a method described below, schedule a specific POS terminal 9 to run a specific process at a specific time. A schedule registered by the user and causing a specific POS terminal 9 to run a specific process at a specific time is referred to below as an event schedule.

The command storage database 213 is a database with a record for each event schedule created by the user.

An event schedule created by the user (the maintenance technician in this example) is described first, and the command storage database 213 is then described below.

To create an event schedule, the maintenance technician starts a browser on the management terminal 5, and accesses a specific URL on the maintenance server 7 for displaying a command input screen G111 (described below). When this specific URL is accessed, the management terminal 5 receives from the maintenance server 7 a file (such as an HTML file) for displaying the command input screen G111 (described below), and based on the received file displays the command input screen G111.

Figure 11:
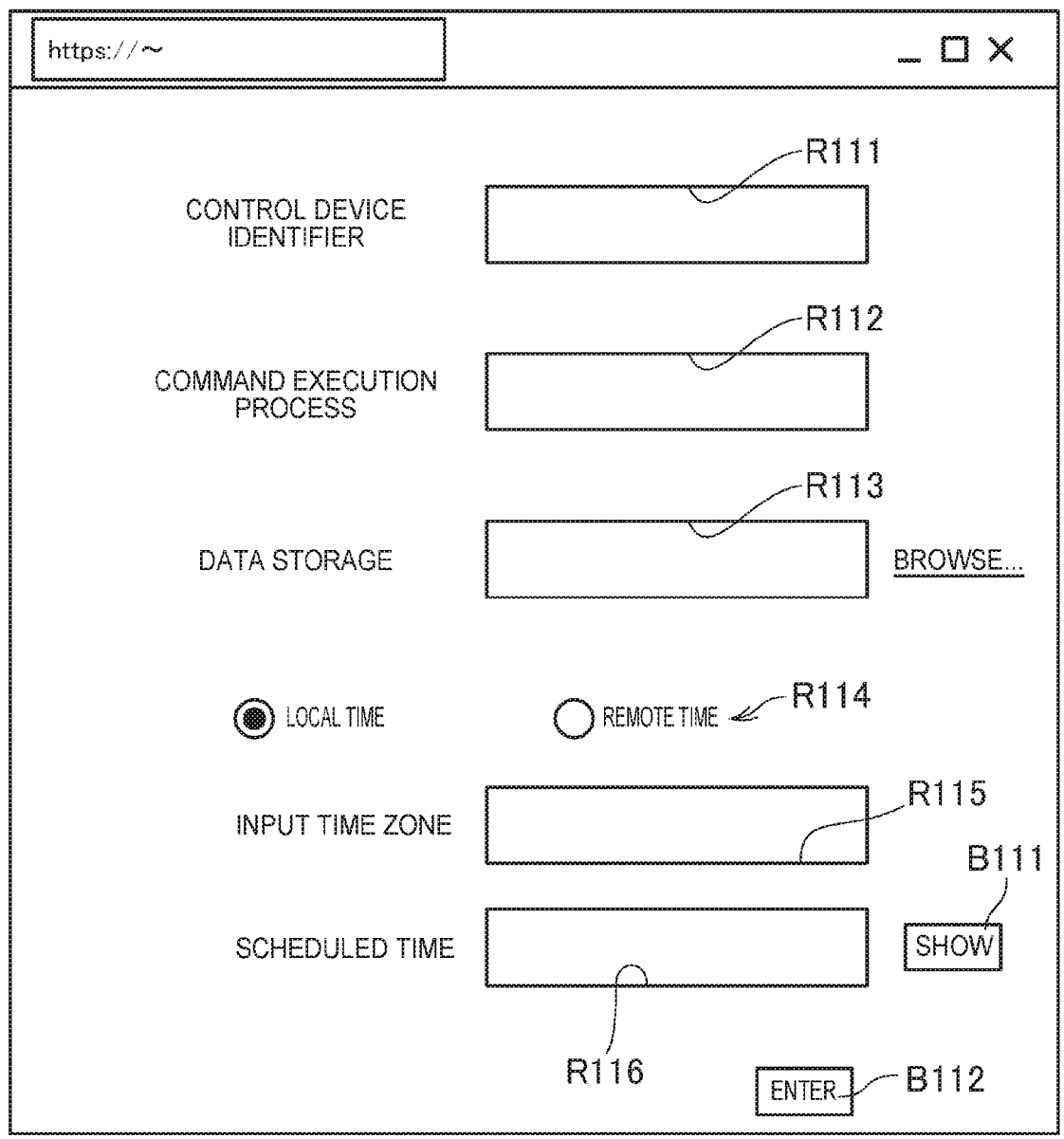
FIG. 11 shows an example of a command input screen G111.

FIG. 11 shows an example of a command input screen G111 (user interface).

As shown in FIG. 11, the command input screen G111 has a control device identifier input field R111. The user inputs to the control device identifier input field R111 the control device identifier of the POS terminal 9 that is to run the specific process.

In this embodiment, the user input the value of the control device identifier directly to the command input screen G111 to schedule an event, but the control device identifier may also be input by other methods. For example, a configuration that can determine the store in which the POS terminal 9 is located, determine the POS terminals 9 in a specific area of the store, and present a list of the control device identifiers of those POS terminals 9 so that the user can select one control device identifier from the list, is also possible.

As shown in FIG. 11, the command input screen G111 also has a command execution process input field R112, and a data storage input field R113.

The process that the POS terminal 9 is scheduled to execute by the event schedule is referred to below as the command execution process.

The command execution process input field R112 is for inputting information indicating the command execution process. The command execution process input field R112 may be a pull-down menu. The pull-down menu of the command execution process input field R112 contains a list of command execution processes that can be run on the POS terminal 9 by a event schedule. In this case, the user inputs information identifying the command execution process to the command execution process input field R112 by selecting the desired information from list of command execution processes in the pull-down menu.

Examples of command execution processes include updating the firmware, installing a new program, uninstalling a program, and returning specific information related to the POS terminal 9.

The data storage input field R113 is for inputting information specifying where data required for the POS terminal 9 to execute the command execution process is stored. If specific data is required for the POS terminal 9 to run the command execution process, the user first stores the specific data in a specific location, and then input information specifying that location to the data storage input field R113.

Examples of data required for the POS terminal 9 to run the command execution process is the update data required for the command execution process to update firmware, and installation data if the command execution process is to install a new program.

As shown in FIG. 11, the command input screen G111 also has a time schedule type selection field R114.

As described further below, in this example the time schedule type can be set to Local Time or Remote Time. The time schedule type selection field R114 is a radio button, and enables selecting either Local Time or Remote Time.

As shown in FIG. 11, the command input screen G111 also has a Local Time input field R115.

The Local Time input field R115 is a field for inputting the time for the POS terminal 9 to run the command execution process referenced to the standard time (referred to below as the Local Time) at the location (time zone) where the maintenance technician inputs to the command input screen G111 (schedules the event).

The location of the POS terminal 9 that is to run the command execution process, and the location where events are scheduled in (data is input to) the command input screen G111 (the location of the management terminal 5 in this example) may be in different time zones. For example, the location where data is input to the command input screen G111 may be in Japan, while the location of the POS terminal 9 that is to run the process is in New York.

In this case, the maintenance technician must select which time zone to use for the event schedule. The time schedule type determines the relationship between the Local Time, and the time, expressed by the standard time in the time zone where the POS terminal 9 is located, when the POS terminal 9 runs the command execution process (referred to below as the Scheduled Time).

If the time schedule type is Local Time, the Local Time and Scheduled Time are coincident. For example, assume data is input to the command input screen G111 in Japan, and the POS terminal 9 is in New York. In this event, if the Local Time is 2015/1/1/17:00 (using 24-hour time notation herein), the Scheduled Time when the time schedule type is Local Time is 2015/1/1/03:00 because there is a 14 hour time difference between Japan and New York. In this case, the Local Time and Scheduled Time arrive at the same time (are simultaneous).

The relationship between Local Time and Scheduled Time when the time schedule type is Remote Time is as follows. That is, the value of the Local Time expressed as standard time where data is input to the command input screen G111, and the value of the Remote Time expressed as standard time where the POS terminal 9 is located, are the same. For example, again assume that data is input to the command input screen G111 in Japan, and the POS terminal 9 is in New York. In this event, if the Local Time is 2015/1/1/17:00 and the time schedule type is Remote Time, the Scheduled Time is also 2015/1/1/17:00. In this case, the Local Time and the Scheduled Time are not coincident, and there is a time difference equal to the time zone difference between the locations.

The maintenance technician inputs to the Local Time input field R115 the time when the command execution process is to run based on the standard time in the time zone of the maintenance technician. The maintenance technician also selects the time schedule type using the radio button of the time schedule type selection field R114.

The maintenance technician may often not be aware of the location of the POS terminal 9 that runs the command execution process, or the time difference between the location of the POS terminal 9 and the location of the maintenance technician. Because the maintenance technician may simply input information indicating the time in the standard time at the location of the maintenance technician as the time for running the command execution process, and select the time schedule type, the time for running the command execution process can be appropriately input even if the maintenance technician does not know the location of the POS terminal 9 that runs the command execution process, or the time difference between the location of the POS terminal 9 and the location of the maintenance technician.

As shown in FIG. 11, the command input screen G111 also has a Scheduled Time display field R116. By pressing the Show button B111, the Scheduled Time reflecting the Local Time input by the maintenance technician and the time schedule type selected by the maintenance technician is shown in the Scheduled Time display field R116. As described above, the Scheduled Time expresses the time when the POS terminal 9 runs the command execution process using the standard time in the location of the POS terminal 9.

More specifically, when Show button B111 is operated, by a function of a script embedded in the drawing file for the command input screen G111, information indicating the control device identifier input to the control device identifier input field R111, information indicating the time schedule type selected by the time schedule type selection field R114, and information indicating the Local Time input to the Local Time input field R115, is sent to the maintenance server 7. The maintenance server 7 receives this information, and based on the information calculates the Scheduled Time. The Scheduled Time may be calculated by any desirable method. The maintenance server 7 then sends information indicating the calculated Scheduled Time to the management terminal 5. The management terminal 5 receives the information, and based on the received information displays in the Scheduled Time display field R116 information indicating the Scheduled Time.

The maintenance technician may operate the Show button B111 as necessary to display information indicating the Scheduled Time in the Scheduled Time display field R116 and confirm the Scheduled Time.

After inputting the necessary information the command input screen G111, the maintenance technician operates Enter button B112 to confirm input.

When input to the command input screen G111 is confirmed by operating Enter button B112, by a function of a script embedded in the drawing file for the command input screen G111, information based on input to the fields of the command input screen G111 is sent to the maintenance server 7. More specifically, the control device identifier input to the control device identifier input field R111, information indicating the command execution process input to the command execution process input field R112, data stored in the location input to the data storage input field R113, information indicating the time schedule type selected in the time schedule type selection field R114, and information indicating the Local Time input to the Local Time input field R115 is sent from the management terminal 5 to the maintenance server 7.

The setting unit 205 of the maintenance server 7 receives the information from the management terminal 5, and based on the received information registers a record in the command storage database 213.

Note that the process of the setting unit 205 registering a record in the command storage database 213 based on the information received from the management terminal 5 is an example of a process setting a scheduled time.

FIG. 12 illustrates information stored in a record of the command storage database 213.

As shown in FIG. 12, each record in the command storage database 213 has an event schedule identifier. An event schedule identifier is an identifier identifying a specific event schedule.

When registering a record, the setting unit 205, by a specific means, generates a unique event schedule identifier.

Each record in the command storage database 213 also includes a control device identifier. When registering a record, the setting unit 205 writes the control device identifier received from the management terminal 5 to the record.

Each record in the command storage database 213 also includes Scheduled Time information indicating the Scheduled Time. When registering a record, the setting unit 205 calculates the Scheduled Time by a specific method based on the time schedule type information and Local Time information input to the Local Time input field R115 received from the management terminal 5, and includes the Scheduled Time information in the record.

Each record in the command storage database 213 also includes command information. Command information is information based on information indicating the command execution process input to the command execution process input field R112, and includes information required for the POS terminal 9 to run the command execution process. For example, the command information may include one or more control commands instructing executing a command execution process (control commands in the command language of the POS terminal 9), and data used to execute the command execution process. When registering a record, the setting unit 205, based on received information indicating the command execution process and data stored in the location input to the data storage input field R113, generates command information and includes the command information in the record. The setting unit 205 has a function for generating command information based on information indicating the command execution process and data stored in the location input to the data storage input field R113.

Each record in the command storage database 213 also includes progress status information. Progress status information is information indicating the progress of the event schedule, and takes one of the values described below.

One value (referred to below as the Unsent value) indicates that transmission (described below) of a command execution instruction based on the event schedule of the corresponding record has not been completed.

Another value (referred to below as the Sent value) indicates that a command execution instruction based on the event schedule of the corresponding record has been sent, but the corresponding process result information (described below) has not been received.

Another value (referred to below as the Completed value) indicates that the corresponding process result information was received.

When creating a record, the setting unit 205 includes progress status information with the Unsent value in the record.

The setting unit 205 manages the progress of the command execution process based on one event schedule using the values of the progress status information contained in the record for the event schedule.

Each record in the command storage database 213 also contains process result content information. The process result content information is described below.

When creating a record, the setting unit 205 sets the process result content information to a null value.

The user (the maintenance technician in this example) scheduling an event (creating a record in the command storage database 213), and the command storage database 213 are described above. However, scheduling events is not limited to the above method, and other methods may be used. For example, an import file in which the required information is recorded may be separately prepared, and the file may be imported to schedule an event (create a record in the command storage database 213). The information stored in the records of the command storage database 213 is also not limited to the above.

As shown in FIG. 10, after referencing the command storage database 213 in step SI1, the response transmitter 202 determines if a corresponding record is in the command storage database 213 (step SI2). A corresponding record is a record having the same control device identifier as the control device identifier recorded in the log data D1, and the progress status information set to the Unsent value. A corresponding record is also a record based on an event schedule for the POS terminal 9 that sent the log data D1, but for which the corresponding command execution instruction has still not been sent.

If a corresponding record is not in the command storage database 213 (step SI2: NO), the response transmitter 202 generates response data not containing a command execution instruction (step SI3). The response transmitter 202 then ends the process of generating response data D2.

If a corresponding record is in the command storage database 213 (step SI2: YES), the response transmitter 202, based on the corresponding record find in step SI1, generates a command execution instruction, and generates response data D2 containing the generated command execution instruction (step SI4).

A command execution instruction is information including and event schedule identifier, control device identifier, scheduled time information, and command information.

In step SI4, the response transmitter 202 extracts from the corresponding record the event schedule identifier, control device identifier, scheduled time information, and command information, and generates a command execution instruction containing the extracted information.

Next, the response transmitter 202 updates the progress status information in the corresponding record found in step SU from the Unsent value to the Sent value (step SI5). Next, the response transmitter 202 ends the process generating response data D2.

As described above, the response transmitter 202 generates response data D2 including a command execution instruction when there is an event schedule for the POS terminal 9 that sent the log data D1 in the command storage database 213, and a command execution instruction based on the event schedule has not been transmitted.

As shown in column (E) of FIG. 5, after response data D2 is generated in step SE2, the response transmitter 202 controls the maintenance server communicator 22 to send the response data D2 to the POS terminal 9 (step SE3). In this example, the response transmitter 202 sends an HTTP response with the response data D2 in the response body by HTTP to the POS terminal 9.

Note that sending response data D2 including a command execution instruction is an example of a process sending a command execution instruction.

Response data D2 including a command execution instruction is an example of control data instructing running a specific process at the Scheduled Time.

As shown in column (B) of FIG. 5, the communication manager 403 of the POS terminal 9 controls the control device communicator 43 to receive the response data D2 (step SB3).

Next, the communication manager 403, based on the received response data D2, runs the corresponding process (step SB4). For example, as described above, received report information is included in the response data D2. In step SB4, the communication manager 403, based on the received report information, reports by a specific method that the maintenance server 7 has successfully received the log data D1 the POS terminal 9 sent.

Next, the communication manager 403 determines if a command execution instruction is in the response data D2 (step SB5).

If not (step SB5: NO), the communication manager 403 ends the process.

If included (step SB5: YES), the communication manager 403 extracts the command execution instruction from the response data D2, and outputs the extracted command execution instruction to the process executor 404 (step SB6). Next, the communication manager 403 ends the process.

As shown in column (C) of FIG. 5, the process executor 404 acquires the command execution instruction the communication manager 403 output (step SC1).

Next, the process executor 404 runs the corresponding process based on the acquired command execution instruction (step SC2).

A process the process executor 404 runs based on a command execution instruction is described below.

Figure 13:
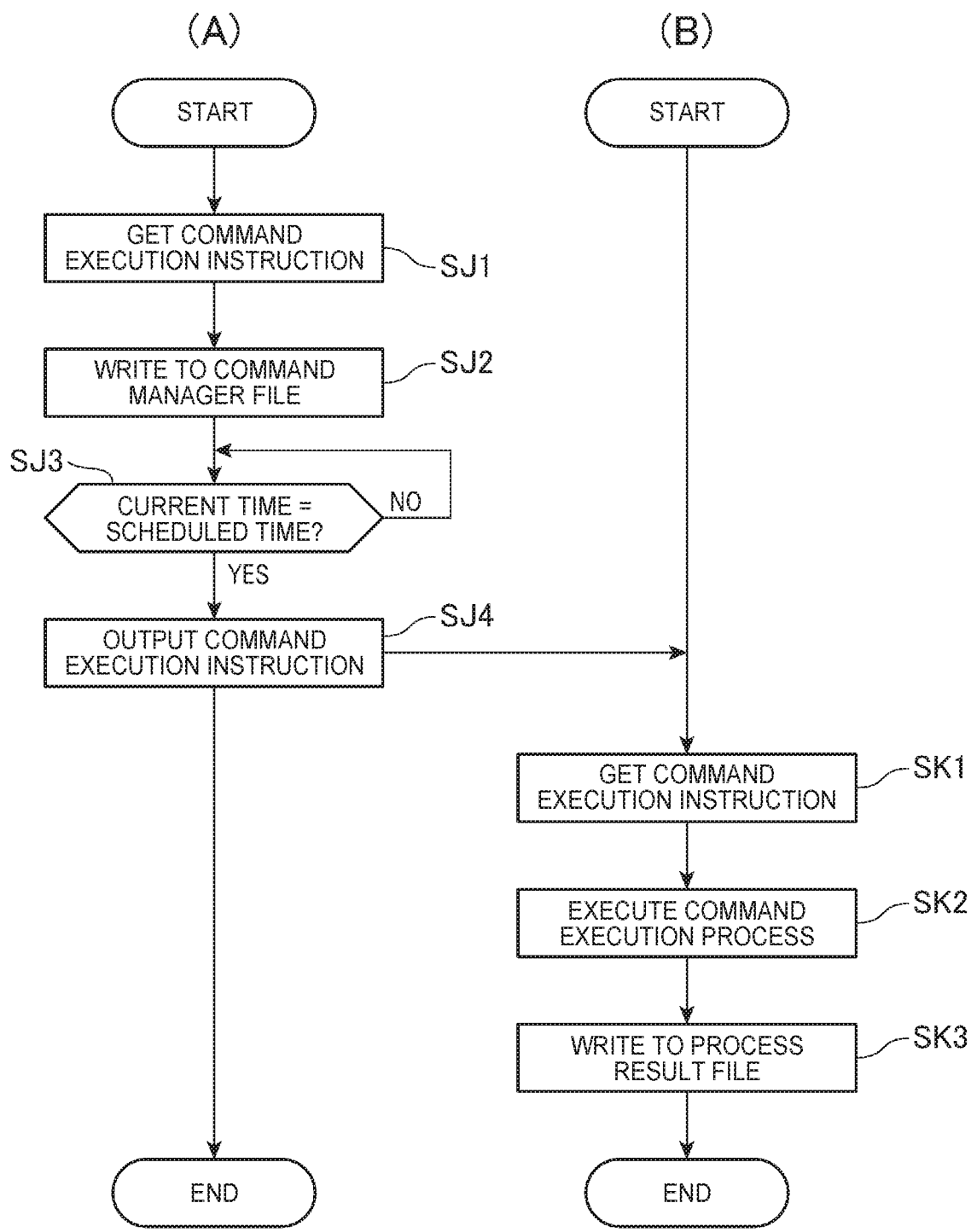
FIG. 13 is a flow chart of a POS terminal operation.

FIG. 13 is a flow chart of the operation of the process executor 404 when executing a process based on a command execution instruction. Column (A) of FIG. 13 shows the operation of the time monitor 4041, and column (B) shows the operation of the command executor 4042.

As shown in column (A) of FIG. 13, the time monitor 4041 acquires the command execution instruction the communication manager 403 output in step SB6 (step SJ1).

Next, the time monitor 4041 records the command execution instruction acquired in step SJ1 in the command manager file 423 (step SJ2). As described above, a command execution instruction includes an event schedule identifier, control device identifier, Scheduled Time information, and command information.

Next, the time monitor 4041 monitors if the current time has reached the Scheduled Time indicated by the Scheduled Time information contained in the command execution instruction recorded in the command manager file 423 (step SJ3).

In step SJ3, if when the POS terminal 9 power turns on the current time is the Scheduled Time, the time monitor 4041 determines that the current time has reached the Scheduled Time.

In step SJ3, if when the POS terminal 9 was turned off the current time was the Scheduled Time, the time monitor 4041 knows in the startup process accompanying the power turning on that the current time has past the Scheduled Time, and determines that the current time has reached the Scheduled Time.

In step SJ3, if the current time is determined to have reached the Scheduled Time (step SJ3: YES), the time monitor 4041 outputs the command execution instruction recorded in the command manager file 423 to the command executor 4042 (step SJ4).

As shown in column (b) of FIG. 13, the command executor 4042 acquires the command execution instruction output by the time monitor 4041 (step SK1).

Next, the command executor 4042, based on the command information in the command execution instruction acquired in step SK1, executes the command execution process (step SK2). As described above, the command information includes information required for the POS terminal 9 to run the command execution process.

After the command execution process is completed, the command executor 4042 records process result information in the process results file 424 (step SK3).

The process result information is information including the event schedule identifier, and process result content information, which is information indicating the result of the command execution process executed in step SK2.

As described above, the process result information recorded in the process results file 424 is recorded in the log data D1 and sent to the maintenance server 7 by sending the log data D1.

As described above, the POS terminal 9 executes a command execution process by the time monitor 4041 and command executor 4042 at the Scheduled Time or the first time the POS terminal 9 turns on after the Scheduled Time has past.

This embodiment of the invention thus enables a user to schedule an event, and cause the POS terminal 9 to execute a specific process at a specific time. The result of this is described below.

To cause a specific POS terminal 9 to execute a specific process at a specific time, command information can be sent from the maintenance server 7 to the POS terminal 9 at a time appropriate to the specific time (including a time approaching the specific time) to cause the POS terminal 9 to execute a command execution process based on the command information. The method has the following problems, however.

That is, as described above, the POS terminal 9 and maintenance server 7 exchange data by the POS terminal 9 sending a response request (request) and the maintenance server 7 returning a response to the response request. As a result, for the maintenance server 7 to make the POS terminal 9 execute a specific process at a specific time, a response request must be sent from the POS terminal 9 at a time appropriate to the specific time.

The POS terminal 9 sends a response request to the maintenance server 7 at the interval defined in the communication interval registry 422. As a result, a response request is not necessarily sent from the POS terminal 9 at a time appropriate to the specific time. If a response request is not sent from the POS terminal 9 at a time appropriate to the specific time, a time lag occurs between the specific time and when the POS terminal 9 actually executes the command execution process.

However, by scheduling an event as described above, a specific POS terminal 9 can be made to execute a specific process at a specific time based on the event schedule regardless of the timing when a response request is sent by the specific POS terminal 9 that is intended to execute the specific process.

The process of steps SG1 and SG2 in the flow chart in column (G) of FIG. 5 is described next.

As shown in column (G) of FIG. 5, the setting unit 205 acquires process result information output from the request receiver 201 for one or plural processes (step SG1).

The setting unit 205 may acquire process result information for more than one process in step SG1, but for brevity the following description describes receiving process result information for one process.

As described above, process result information contains an event schedule identifier and process result content information.

Next, the setting unit 205, based on the process result information acquired in step SG1, updates the command storage database 213 (step SG2).

More specifically, in step SG2, the setting unit 205 finds the corresponding record in the records of the command storage database 213. A corresponding record is a record holding the same event schedule identifier as the event schedule identifier in the process result information acquired in step SG1.

Next, the setting unit 205 updates the value of the progress status information in the corresponding record that was found to the Completed value indicating that the corresponding process result information was received.

Next, the setting unit 205 overwrites the process result content information in the corresponding record that was found (which is the null value at this time) with the process result content information contained in the process result information acquired in step SG1.

As described above, the value of the progress status information in the corresponding record of the command storage database 213 is set to the Completed value based on completion of the command execution process based on an event schedule by the POS terminal 9. Process result content information indicating the process result of the command execution process is also written to the corresponding record of the command storage database 213 based on completion of the command execution process based on an event schedule by the POS terminal 9.

Another function of the setting unit 205 is described next.

The setting unit 205 has ability to report to the user event schedule-related information based on the command storage database 213. This function of the setting unit 205 is described below with the user being the maintenance technician.

To get information related to an event schedule, the maintenance technician starts a browser on the management terminal 5, and accesses a specific URL on the maintenance server 7 for displaying an event schedule information input screen G141 (described below). When this specific URL is accessed, the management terminal 5 receives from the maintenance server 7 a file (such as an HTML file) for displaying the event schedule information input screen G141 (described below), and based on the received drawing file displays the event schedule information input screen G141.

Figure 14:
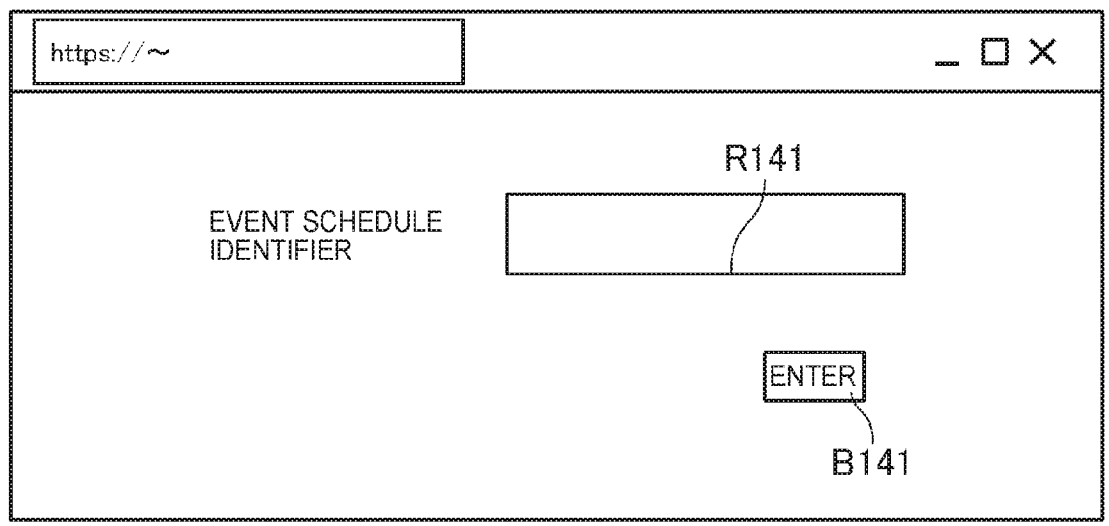
FIG. 14 illustrates an event schedule information input screen.

FIG. 14 shows an example of a event schedule information input screen G141.

As shown in FIG. 14, the event schedule information input screen G141 has an event schedule identifier input field R141. The event schedule information input screen G141 also has Enter button B141 for confirming input.

The maintenance technician inputs the event schedule identifier of the event schedule for which information is wanted to event schedule identifier input field R141, and operates Enter button B141 to confirm input. Note that the maintenance technician can acquire the event schedule identifier for the desired event schedule by a specific means.

When Enter button B141 is operated, by a function of a script embedded in the drawing file for the event schedule information input screen G141, the event schedule identifier input to the event schedule identifier input field R141 is sent to the maintenance server 7.

The setting unit 205 of the maintenance server 7 receives and acquires the event schedule identifier the management terminal 5 sent. Next, the setting unit 205 finds the corresponding record in the records of the command storage database 213. A corresponding record is a record having the same event schedule identifier as the acquired event schedule identifier. Next, the setting unit 205 acquires the progress status information and process result content information from the corresponding record that was found. Next, the setting unit 205 generates, based on the acquired progress status information and process result content information, a drawing file for the event schedule information display screen G151 (described below), and sends the generated drawing file to the management terminal 5 to display the event schedule information display screen G151.

Figure 15:
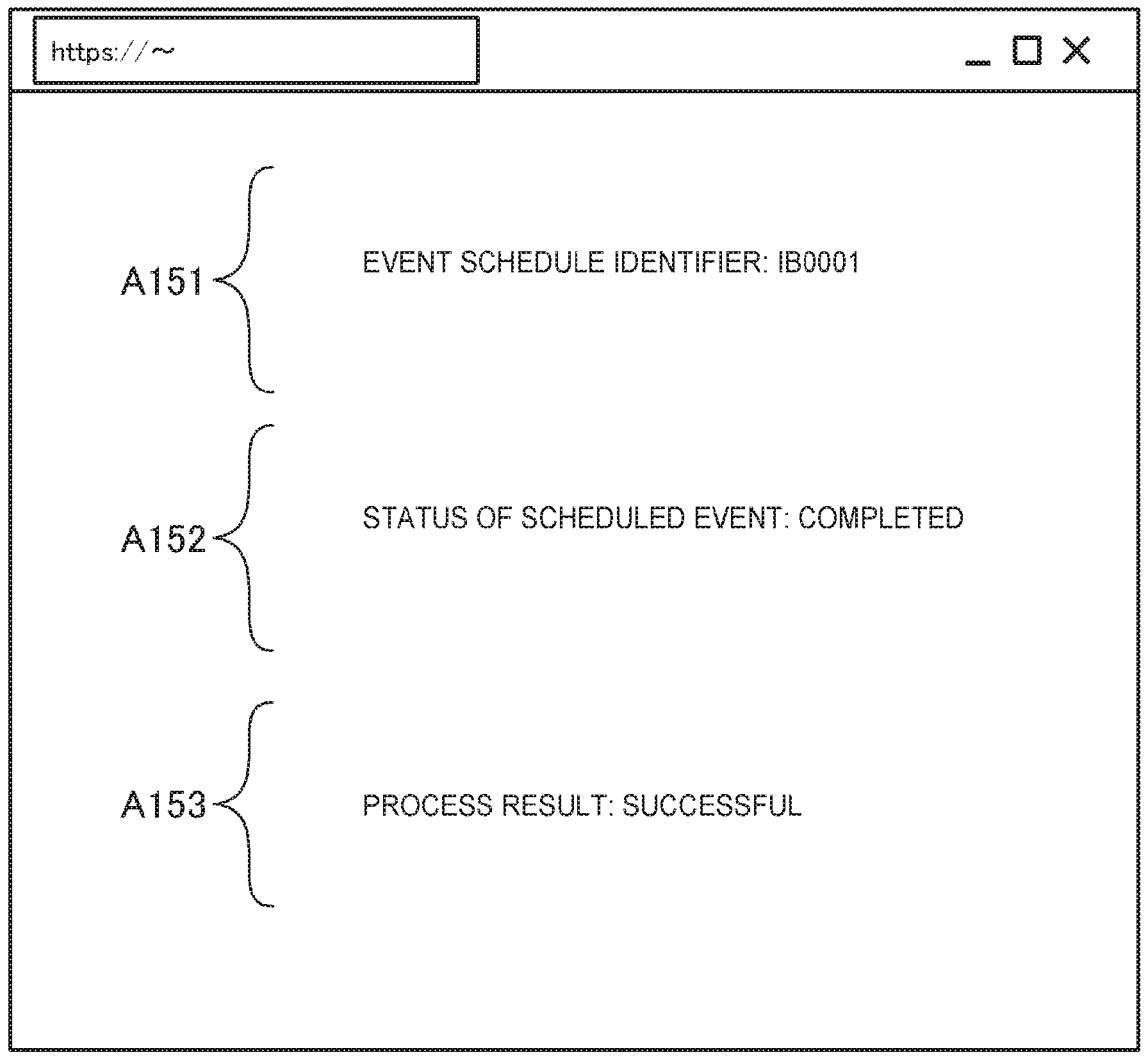
FIG. 15 illustrates an event schedule information display screen.

FIG. 15 shows an example of an event schedule information display screen G151.

As shown in FIG. 15, event schedule information display screen G151 has line A151, line A152, and line A153.

The event schedule identifier is displayed on line A151.

Information indicating the progress of the event schedule is displayed on line A152. The setting unit 205, based on the progress status information, determines the information to display on line A152.

More specifically, if the progress status information is the Unsent value, the setting unit 205 displays on line A152 information indicating the command execution instruction based on the event schedule has not been sent.

If the progress status information is the Sent value, the setting unit 205 displays on line A152 information indicating the command execution instruction based on the event schedule has been sent but the command execution process based on the event schedule is not completed.

If the progress status information is the Completed value, the setting unit 205 displays on line A152 information indicating execution of the command execution instruction based on the event schedule has been completed. Based on the Completed value of the progress status information, the example in FIG. 15 shows on line A152 information indicating that execution of the command execution process based on the event schedule was completed.

If the progress status information is the Completed value, information indicating the result of the POS terminal 9 executing the command execution process is shown on line A153. The setting unit 205 determines the information displayed on line A153 based on the process result content information.

By referencing the event schedule information display screen G151, the maintenance technician or other user can know, for a desired event schedule, the progress of the event schedule and the process result if the command execution process was completed.

Operation of the maintenance server 7 when providing useful information for POS terminal 9 maintenance, for example, to the maintenance technician (meaning, as described above, a person responsible for maintaining the POS terminal 9) is described next.

Note that in the operation described below the maintenance technician uses the management terminal 5.

To get information related to a specific POS terminal 9, the maintenance technician starts a browser on the management terminal 5, and accesses a specific URL on the maintenance server 7.

When this specific URL is accessed, the information provider 204 of the management terminal 5 generates a drawing file (such as an HTML file) for displaying a control device identifier input screen G161 (described below), and sends the file to the management terminal 5.

By a function of the browser, the management terminal controller 30 of the management terminal 5 receives the drawing file, and based on the received drawing file controls the management terminal display 33 to display the control device identifier input screen G161 on the display panel.

As shown in FIG. 6 shows an example of the control device identifier input screen G161.

Figure 16:
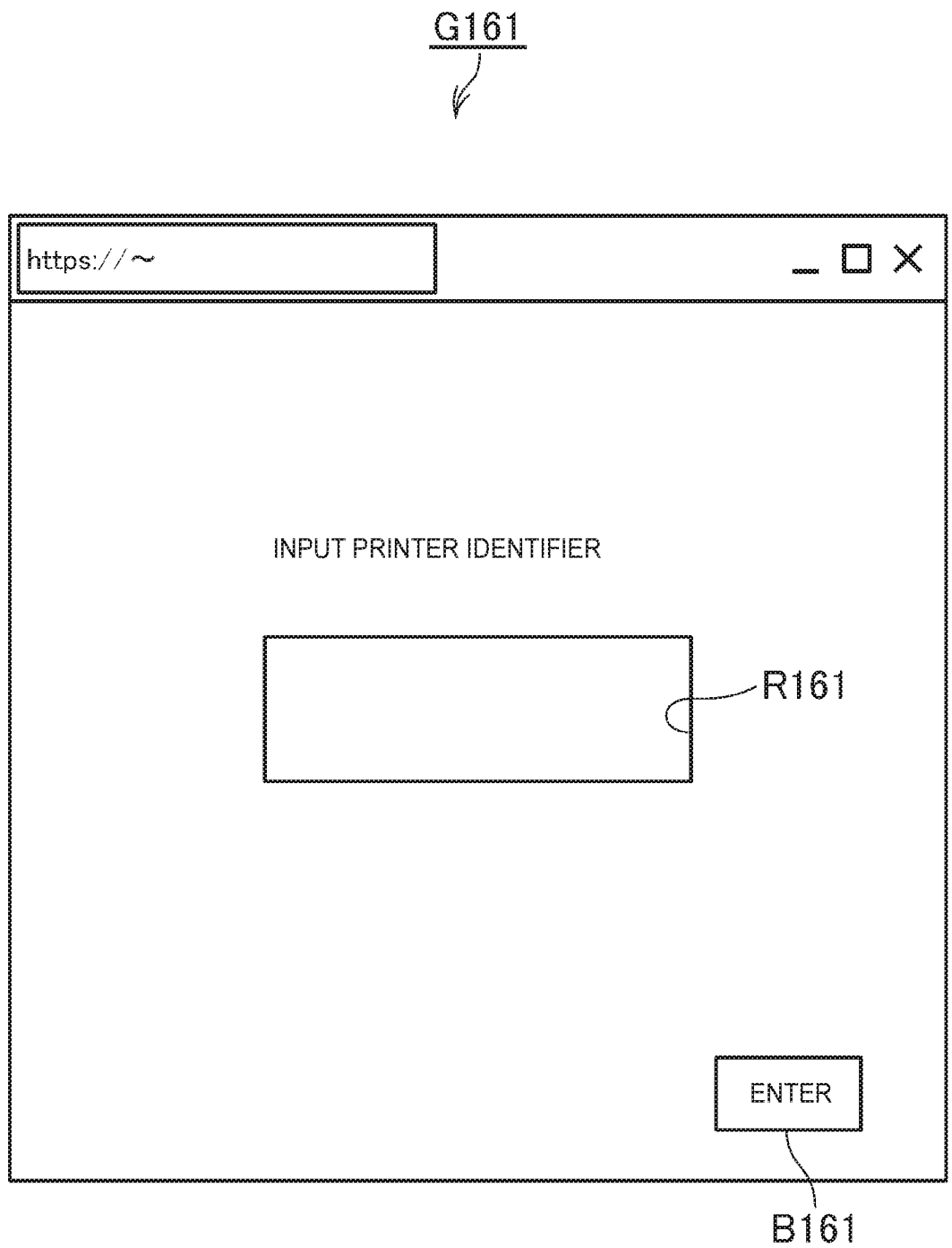
FIG. 16 shows an example of a control device identifier input screen.

As shown in FIG. 16, control device identifier input screen G161 has an input field R161 for inputting a control device identifier. The maintenance technician inputs to the input field R161 the control device identifier of the POS terminal 9 for which information is desired, and confirms input by operating the Enter button B161. In response to confirming input, the control device identifier is sent to the maintenance server 7 by a function of a script embedded in the drawing file.

The information provider 204 of the maintenance server 7 receives the control device identifier. Next, the information provider 204, based on the received control device identifier, finds the corresponding record in the error database 212. A corresponding record is a record storing the same control device identifier as the received control device identifier. Next, the information provider 204, based on the corresponding record that was found, generates a drawing file for displaying an information provider screen G171 (FIG. 17), and sends the file to the management terminal 5.

The management terminal controller 30 of the management terminal 5, by a function of the browser, receives the drawing file, controls the management terminal display 33 based on the received drawing file, and displays the information provider screen G171 on the display panel.

FIG. 17 shows an example of a information provider screen G171.

As shown in FIG. 17, information provider screen G171 has lines A171 and lines A172.

On lines A171 are displayed basic information related to the POS terminal 9 of the control device identifier input by the maintenance technician. In the example in FIG. 17, the basic information related to the POS terminal 9 includes information indicating the model of POS terminal 9, information indicating the version of firmware installed on the POS terminal 9, information indicating the name of the store where the POS terminal 9 is located, information indicating the address of the store, information indicating the telephone number of the store, and information indicating the lane number of the checkout counter where the POS terminal 9 is used. The basic information related to the POS terminal 9 is not limited to the foregoing.

A database relationally storing the control device identifier and basic information related to the POS terminal 9 is stored for each POS terminal 9 in the maintenance server storage 21 of the maintenance server 7. Based on this database, the information provider 204 acquires the basic information related to the POS terminal 9.

By referring to the information displayed on lines A171 of the information provider screen G171, the maintenance technician can acquire basic information related to the POS terminal 9, and, as may be necessary, telephone the store, for example.

As shown in FIG. 17, information indicating whether or not a CPU error occurred, information indicating whether or not a printhead error occurred, information indicating whether or not a cutter error occurred, and information indicating whether or not a memory error occurred, is displayed on lines A172.

By referring to the information displayed on line A172, the maintenance technician can know whether or not a CPU error, printhead error, cutter error, or memory error has occurred, and take appropriate action if any error has occurred.

Appropriate action includes, for example, informing the administrator of the store that an error occurred and what action to take, if an error occurred.

The operation of a POS terminal 9 installed in the store when the POS terminal 9 is turned on is described next.

Figure 18:
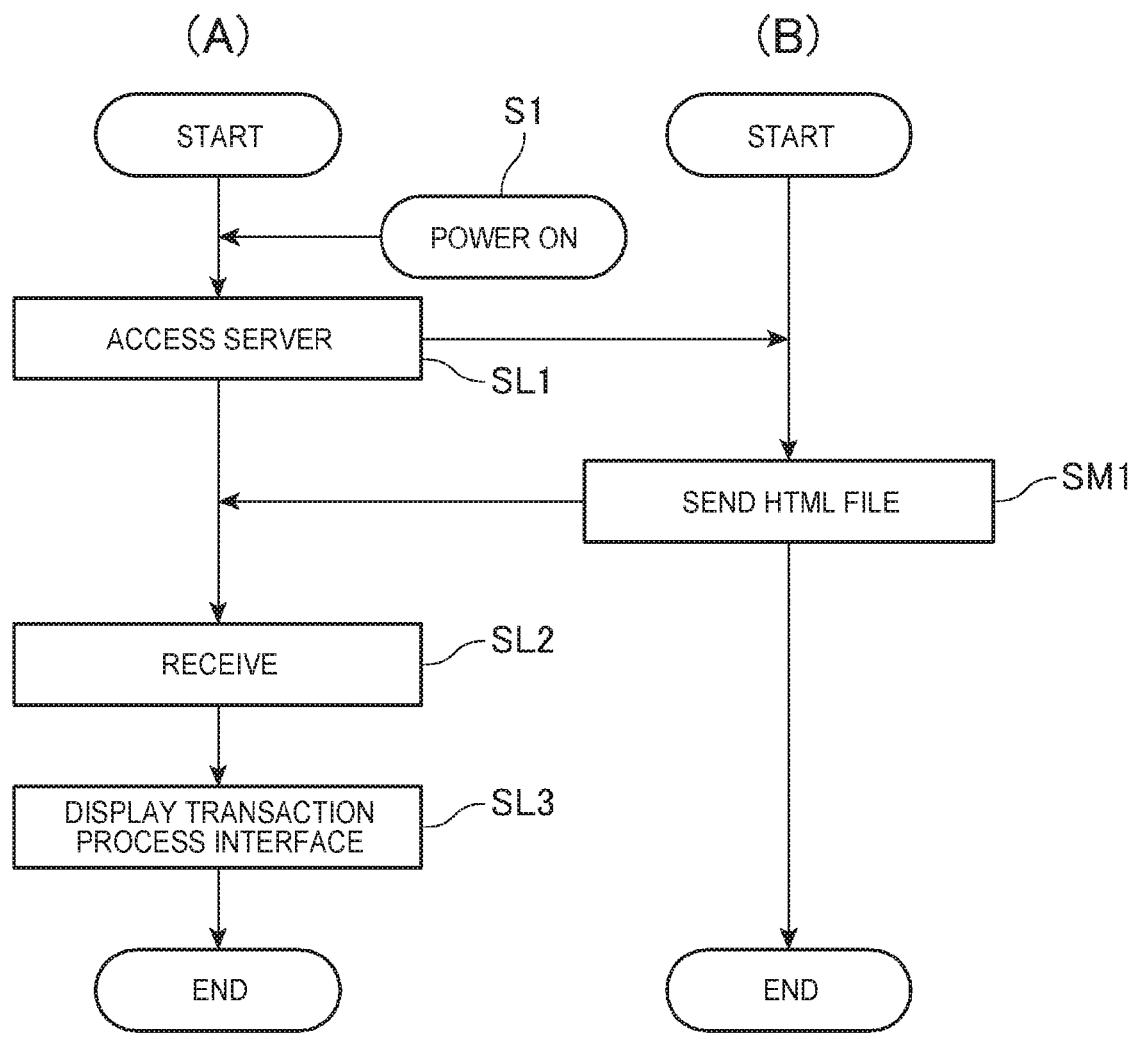
FIG. 18 is a flow chart of the operation of a POS terminal and POS server.

FIG. 18 is a flow chart showing the operation of the POS terminal 9 and POS server 10 when the POS terminal 9 is turned on. Column (A) of FIG. 18 shows the operation of the POS terminal 9, and column (B) shows the operation of the POS server 10.

The checkout clerk first turns the POS terminal 9 on (step S1). In this example, the POS terminal 9 is installed at a checkout counter, and the checkout clerk turns the POS terminal 9 on when the store opens each day. In this embodiment, the POS terminal 9 is configured to automatically start a specific web browser when the POS terminal 9 turns on.

As shown in column (A) of FIG. 18, the printing controller 405 of the POS terminal 9 accesses a specific URL on the POS server 10 (step SL1). The URL of the POS server 10, the format of data exchanged in communication with the POS server 10, and other information required to communicate with the POS server 10 is previously registered in the POS terminal 9.

As shown in column (B) of FIG. 18, when the specific URL is accessed by the POS terminal 9, the transaction-related process executor 501 of the POS server 10 controls the POS server communicator 52 to send a specific HTML file to the POS terminal 9 (step SM1). The specific HTML file is an HTML file having at least a function for displaying the user interface for processing transactions 70 described below.

As shown in column (A) of FIG. 18, the printing controller 405 of the POS terminal 9 controls the control device communicator 43 to receive and acquire the specific HTML file (step SL2).

Next, the printing controller 405 executes the acquired specific HTML file, and displays a user interface for processing transactions 70 (FIG. 19) on the touch panel TP (step SL3).

Figure 19:
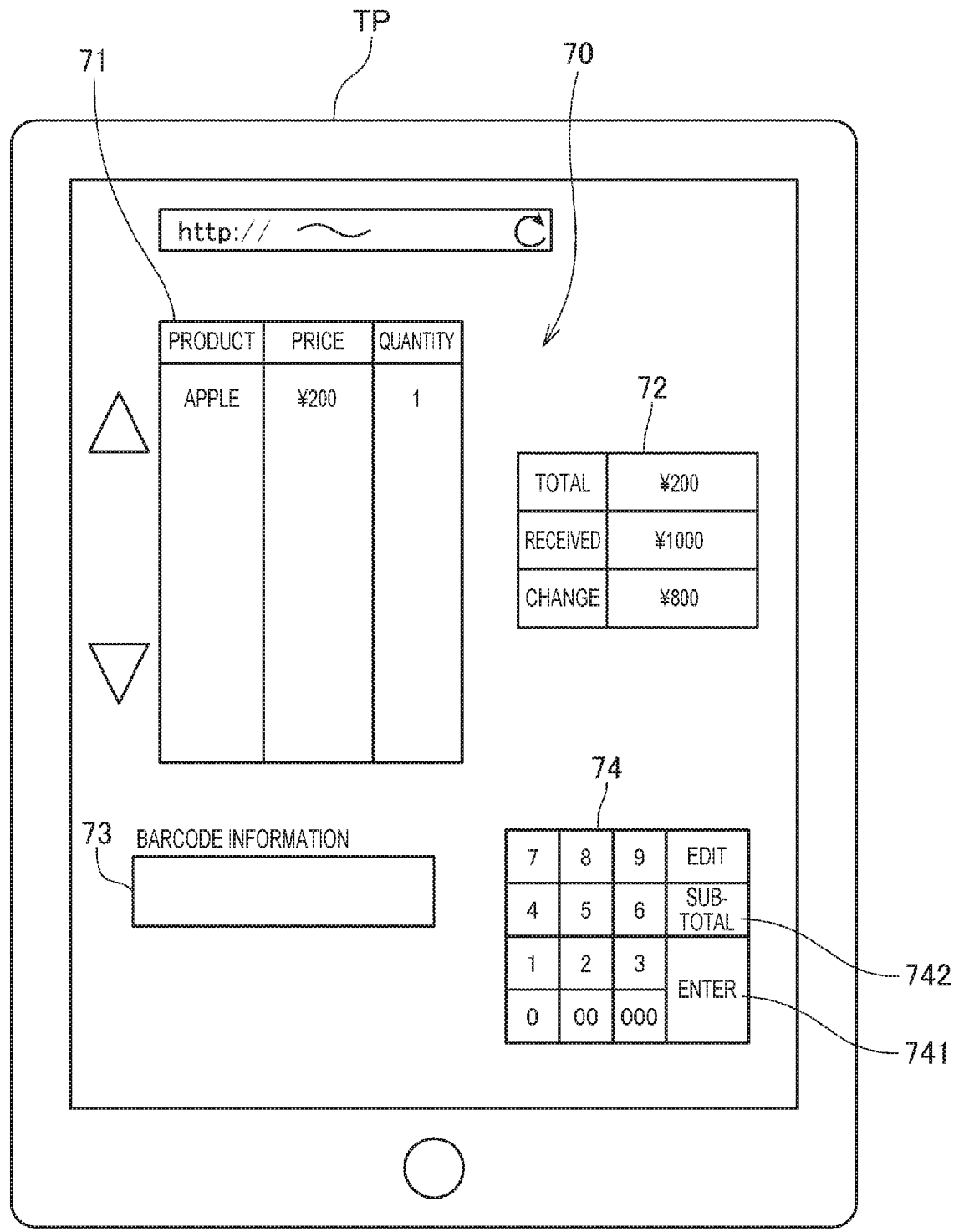
FIG. 19 shows an example of a user interface for transaction processing.

FIG. 19 shows an example of a user interface for processing transactions 70 that is displayed on the touch panel TP.

A list display area 81 where the names of the products being purchased by the customer, the prices of the products, and the quantities of the products are presented in a list is displayed at the top left of the user interface for processing transactions 70 in FIG. 19. To the right of this list display area 71 is presented an amount display area 72 where the total amount of the products being purchased by the customer, the amount of money received from the customer in the transaction, and the amount of change due to the customer are displayed.

Below the list display area 71 is a barcode information display area 73 where information (referred to below as barcode information) expressed by the barcode that is read by the barcode scanner BS is displayed. The barcode information is basically the product code assigned to the product.

A virtual keypad 74 is displayed on the right side of the barcode information display area 73. The virtual keypad 74 includes an Enter key 741 for finalizing the transaction, and a Subtotal key 742 for calculating the subtotal (the total of the products purchased by the customer).

The checkout clerk then processes the transaction using the user interface for processing transactions 70 at the checkout counter.

As described above, a user interface for processing transactions 70 used to process a transaction (business) at the checkout counter L is automatically displayed on the touch panel TP of the POS terminal 9 when the POS terminal 9 turns on. As a result, there is no need for the operator to input the URL of the POS server 10, for example, when the POS terminal 9 turns on, and the productivity of the operator and user convenience are excellent.

The transaction process executed by the POS terminal 9 during a transaction at the checkout counter is described next.

Figure 20:
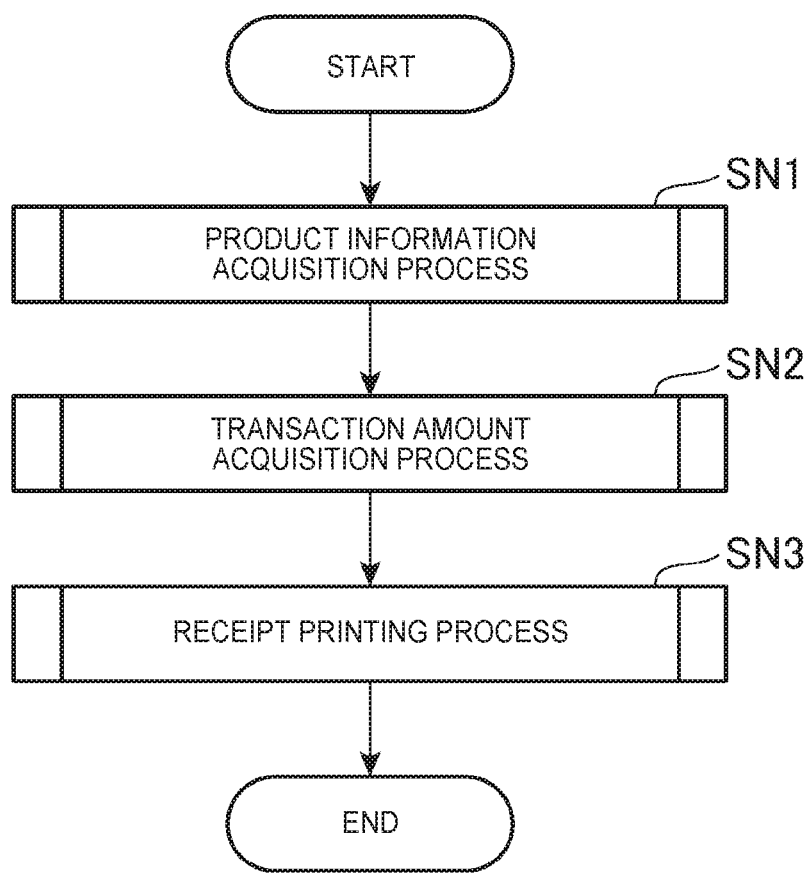
FIG. 20 is a flow chart of POS terminal operation.

FIG. 20 is a flow chart of the operation of the POS terminal 9 when executing the transaction process.

As shown in FIG. 20, during the transaction process, the printing controller 405 of the POS terminal 9 first executes a product information acquisition process (step SN1).

In the product information acquisition process, the printing controller 405 communicates with the POS server 10 to acquire the name and price of each item the customer purchases (referred to below as product-related information), and executes processes based on the acquired product-related information. This product information acquisition process is described further below.

Figure 21:
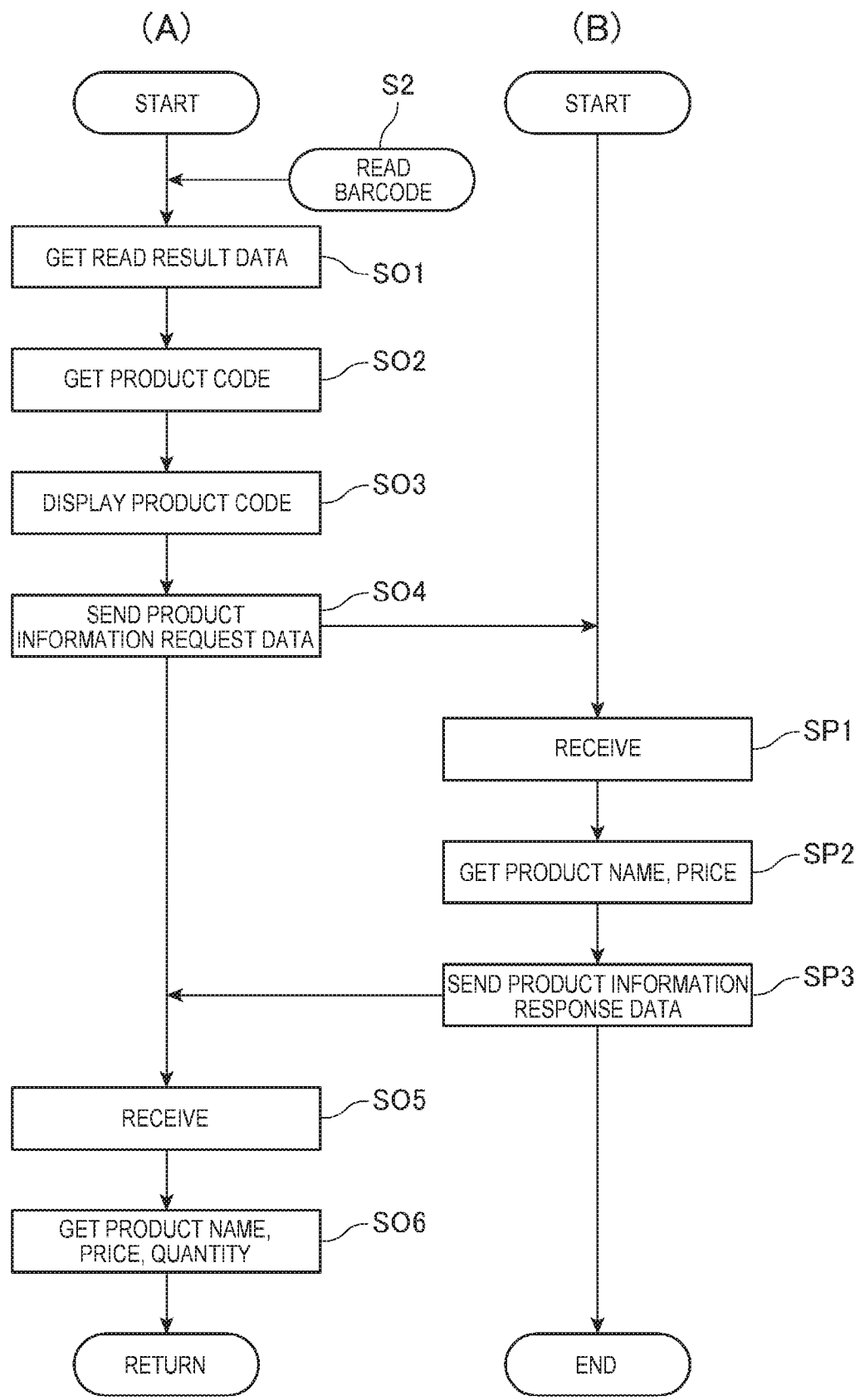
FIG. 21 is a flow chart of POS terminal operation and POS server operation.

FIG. 21 is a flow chart of the operation of the POS terminal 9 and the POS server 10 when executing the product information acquisition process. Column (A) of FIG. 21 shows the operation of the POS terminal 9, and column (B) of FIG. 21 shows the operation of the POS server 10.

In the transaction process at the checkout counter, the checkout clerk reads the barcode on the product or the packaging of the product being purchased by the customer with the barcode scanner BS (step S2). Upon reading a barcode, the barcode scanner BS sends data based on the read result (referred to below as the "read result data") through the port to which the barcode scanner BS is connected to the control device-side device communicator 44 of the POS terminal 9. The control device-side device communicator 44 then outputs the read result data to the control device controller 40.

The read result data is data including information indicating the product code of the product.

As shown in column (A) of FIG. 21, the printing controller 405 of the control device controller 40 of the POS terminal 9 then acquires the read result data based on the input from the control device-side device communicator 44 (step S01).

Next, the printing controller 405 acquires the product code based on the read result data (step SO2).

Next, the printing controller 405 displays the product code acquired in step SO2 in the barcode information display area 73 of the user interface for processing transactions 70 (step SO3).

Next, the printing controller 405 controls the control device communicator 43 to send the product name for the product code acquired in step SO2 and data querying the price of the product (referred to below as product information request data) to the POS server 10 (step SO4).

As shown in column (B) of FIG. 21, the transaction-related process executor 501 of the POS server 10 controls the POS server communicator 52 to receive the product information request data (step SP1).

Next, the transaction-related process executor 501, based on the received product information request data, acquires the product code, references the product master 511 stored by the POS server storage 51, and acquires the name and price of the product identified by the acquired product code (step SP2).

Next, the transaction-related process executor 501 controls the POS server communicator 52 to send product information response data indicating the product name and price information acquired in step SP2 to the POS terminal 9 (step SP3).

As shown in column (A) of FIG. 21, the printing controller 405 of the POS terminal 9 then controls the control device communicator 43 to receive the product information response data (step SO5).

Next, the printing controller 405 acquires the product name and product price information based on the received product information response data, and displays the name, price, and quantity of the product in the corresponding fields of the list display area 71 in the user interface for processing transactions 70 (step SO6).

In the product information acquisition process of step SN1 in FIG. 20, the checkout clerk reads the barcode with the barcode scanner BS from each product being purchased by the customer, and the POS terminal 9 and POS server 10 execute the process shown in the flow chart in FIG. 21 based on the read barcode.

When reading the barcode from every product and processing by each device based on the read barcode is completed, the product information acquisition process shown in step SN1 in FIG. 20 ends.

When the barcode of every product has been read and processing by each device based on the read barcode is completed, the name, price, and quantity of each product the customer purchases is displayed in the list display area 71.

As shown in FIG. 20, after completing the product information acquisition process in step SN1, the printing controller 405 executes a transaction amount acquisition process (step SN2). In the transaction amount acquisition process of step SN2, the printing controller 405 acquires the total amount of the products purchased by the customer, and acquires the amount of change due based on the amount received from the customer. This transaction amount acquisition process is described further below.

Figure 22:
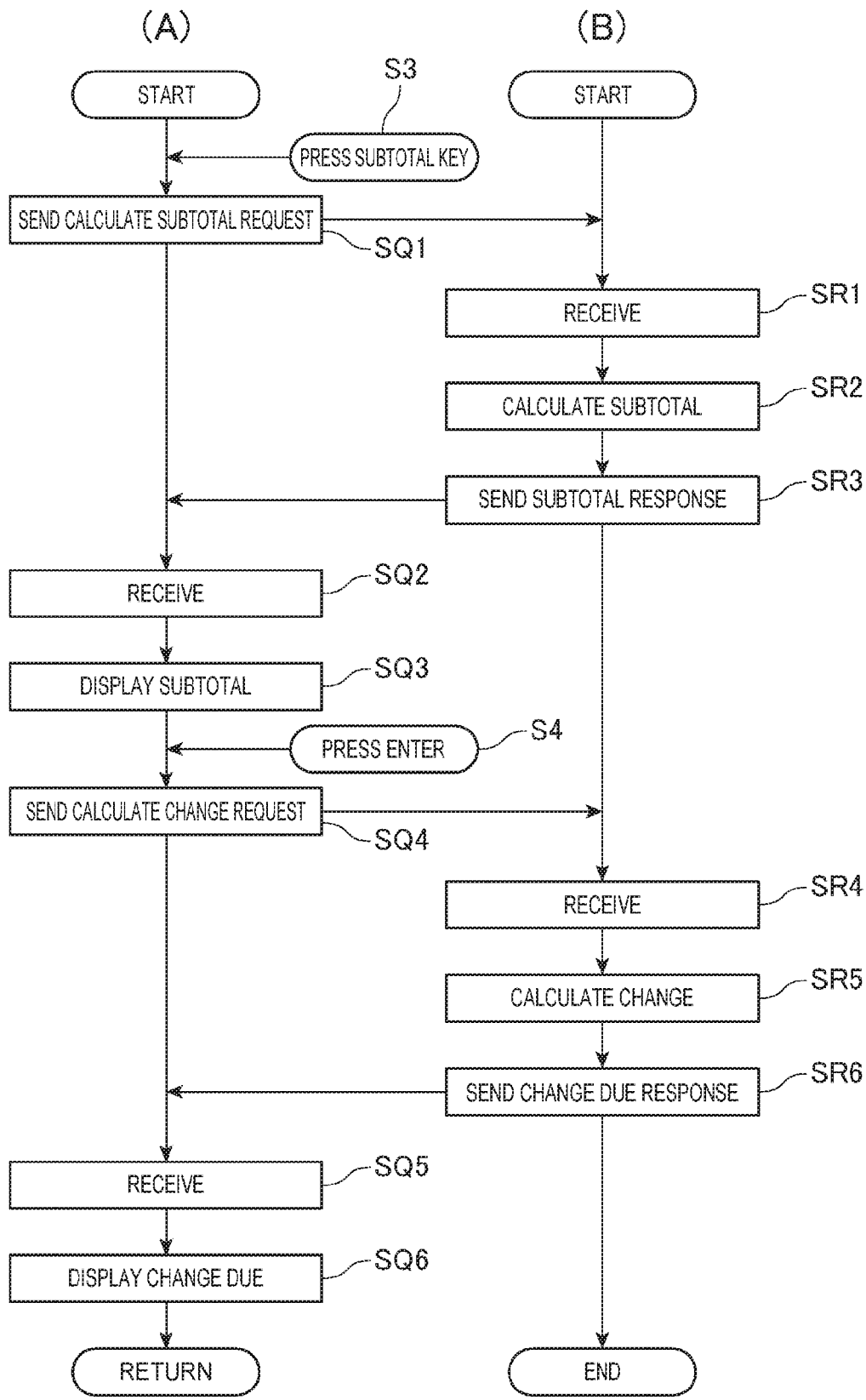
FIG. 22 is a flowchart of POS terminal and POS server operation.

FIG. 22 is a flow chart showing the operation of the POS terminal 9 and the related operation of the POS server 10 in the transaction amount acquisition process. Column (A) of FIG. 22 shows the operation of the POS terminal 9, and column (B) of FIG. 22 shows the operation of the POS server 10.

When reading the barcode from every product is completed, the checkout clerk operates the Subtotal key 742 of the virtual keypad 74 (step S3).

As shown in column (A) of FIG. 22, when operation of the Subtotal key 742 is detected, the printing controller 405 of the POS terminal 9 generates a subtotal calculation request requesting calculating the subtotal, and controls the control device communicator 43 to send the request to the POS server 10 (step SQ1).

As shown in column (B) of FIG. 22, the transaction-related process executor 501 of the POS server 10 controls the POS server communicator 52 to receive the subtotal calculation request (step SR1).

Next, the transaction-related process executor 501 calculates the subtotal based on the received subtotal calculation request (step SR2). Note that the transaction-related process executor 501 manages the product codes of the products purchased by the customer based on the product information response request and associated data received from the POS terminal 9. In step SR2, the transaction-related process executor 501 references the product master 511 based on the managed product codes, and calculates the subtotal (the total of the purchased products). The method of calculating the subtotal is not limited to this example, and any appropriate method may be used.

Next, the transaction-related process executor 501 sends a subtotal response denoting the calculated subtotal to the POS terminal 9 (step SR3).

As shown in column (A) of FIG. 22, the printing controller 405 of the POS terminal 9 controls the control device communicator 43 to receive the subtotal response (step SQ2).

Next, the printing controller 405, based on the received subtotal response, displays the subtotal (the total of the purchased products) in the appropriate field of the amount display area 72 (step SQ3).

When the subtotal is displayed in the amount display area 62, the customer pays the checkout clerk. The checkout clerk receives payment from the customer, inputs the amount received through the virtual keypad 74, and operates the Enter key 741 (step S4). When operation of the Enter key 741 is detected, the printing controller 405 displays the amount received from the customer in the corresponding field of the amount display area 72.

When operation of the Enter key 741 is detected, the printing controller 405 also sends a calculate change request requesting calculating the amount of change due to the POS server 10 (step SQ4).

As shown in column (B) of FIG. 22, the transaction-related process executor 501 of the POS server 10 controls the POS server communicator 52 to receive the calculate change request (step SR4).

Next, the transaction-related process executor 501 calculates the amount of change due (step SR5).

Next, the transaction-related process executor 501 sends a change-due response indicating the calculated amount of change due to the POS terminal 9 (step SR6).

As shown in column (A) of FIG. 22, the printing controller 405 of the POS terminal 9 controls the control device communicator 43 to receive the change-due response (step SQ5).

Next, the printing controller 405, based on the received change-due response, displays the amount of change in the appropriate field of the amount display area 72 (step SQ6).

Based on the change amount displayed in the amount display area 72, the checkout clerk returns change to the customer.

As described above, in the transaction amount acquisition process of step SN2, the printing controller 405 acquires the total of the purchased products, and then gets the amount of change due to the customer based on the amount received from the customer.

As shown in FIG. 20, after the transaction amount acquisition process, the printing controller 405 executes a process of printing a receipt (step SN3). In the receipt printing process of step SN3, the printing controller 405 communicates with the POS server 10 to produce a receipt printed with information including information related to the products purchased by the customer, and the total of the purchased products. This receipt printing process is described below.

Figure 23:
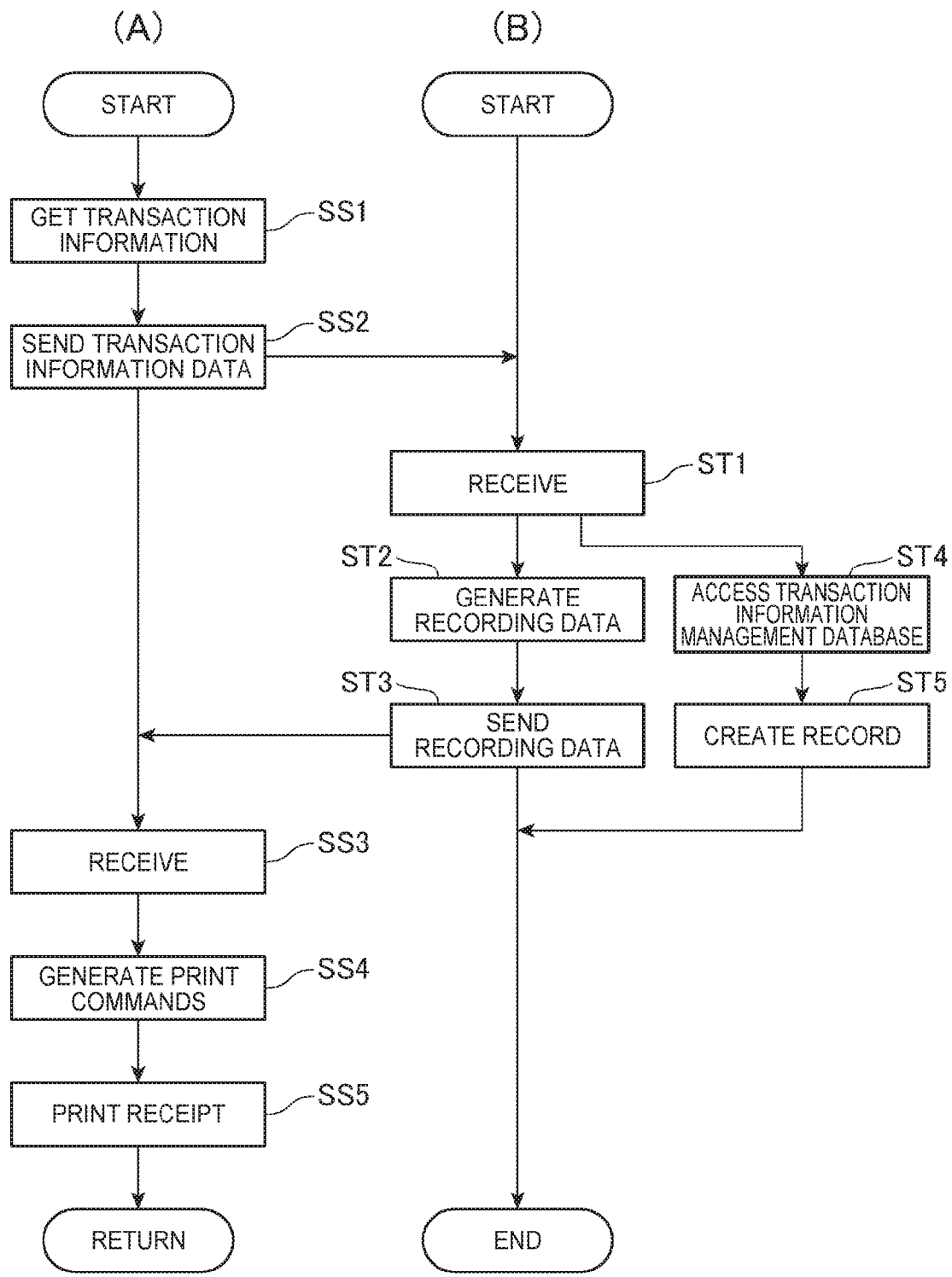
FIG. 23 is a flowchart of POS terminal and POS server operation.

FIG. 23 is a flow chart showing the operation of the POS terminal 9 and the POS server 10 when executing the receipt printing process. Column (A) of FIG. 23 shows the operation of the POS terminal 9, and column (B) of FIG. 23 shows the operation of the POS server 10.

As shown in column (A) of FIG. 23, when the transaction amount acquisition process ends, the printing controller 405 of the POS terminal 9 acquires the transaction information (step SS1).

The transaction information is information including: an identifier uniquely assigned to each transaction (referred to below as the transaction identifier); information denoting the combination of product code, name, price, and quantity for each product purchased by the customer (referred to below as the purchased product information); information denoting the subtotal, the cash amount received from the customer, and the change returned to the customer (referred to below as transaction amount information); information denoting the time of the transaction (referred to below as the transaction time information); and a store identifier for the store where the transaction was completed.

Note that during a transaction the printing controller 405 stores information contained the purchased product information and information contained in the transaction amount information to specific storage areas. In step SS1, the printing controller 405 acquires purchased product information and transaction amount information based on the information stored to the specific storage areas.

The time that the transaction was performed as indicated by the transaction time information is the time when the Enter key 741 was operated. The time that the transaction was performed as indicated by the transaction time information is not limited to the time that the Enter key 741 was operated, and may be any time derived from the transaction, such as the time when the barcode for the first product was read in the transaction.

The printing controller 405 also has a function for generating a transaction identifier for each transaction, and generates the transaction identifier using this function. The value of the transaction identifier is unique to each transaction performed in each store.

After acquiring the transaction information, the printing controller 405 controls the control device communicator 43 to send transaction information data expressing the acquired transaction information to the POS server 10 (step SS2).

As shown in column (B) of FIG. 23, the transaction-related process executor 501 of the POS server 10 controls the POS server communicator 52 to receive the transaction information data (step ST1).

Next, the transaction-related process executor 501 generates recording data for producing a receipt in a specific layout based on the transaction information indicated by the received transaction information data (step ST2).

The recording data is control data specifying producing a receipt according to a specific layout, and including in this example a top logo, bottom logo, transaction identifier, the time of the transaction, the name, price, quantity and total amount of the products purchased by the customer, the amount received from the customer, and the amount of change due to the customer. The recording data in this embodiment is an XML document of information written in a specific XML format.

Next, the transaction-related process executor 501 controls the POS server communicator 52 to send the generated recording data to the POS terminal 9 (step ST3).

After receiving the transaction information data in step ST1, the transaction-related process executor 501 accesses the transaction information manager database 512 stored by the POS server storage 51 (step ST4).

Each record in the transaction information manager database 512 relationally stores the transaction identifier, purchased product information, transaction amount information, transaction time information, and store identifier.

Next, based on the transaction information data received in step ST1, a record relating the transaction identifier, purchased product information, transaction amount information, transaction time information, and store identifier is created in the transaction information manager database 512 (step ST5).

The POS server 10 thus cumulatively stores transaction information appropriate to each transaction. As a result, information such as sales by store and sales by individual product in each store can be managed.

As shown in column (A) of FIG. 23, the printing controller 405 of the POS terminal 9 controls the control device communicator 43 to receive the recording data (step SS3).

Next, the printing controller 405 generates recording commands in the command language of the print unit 41 based on the recording data in the XML document (step SS4).

Next, the printing controller 405 controls the print unit 41 based on the generated recording commands to produce a receipt (step SS5).

The checkout clerk then gives the receipt produced in step SS5 to the customer.

As described above, the POS terminal 9 in this embodiment of the invention executes a transaction process and produces a receipt appropriate to the transaction using functions of the POS server 10. The POS server 10 also cumulatively stores transaction information derived from transaction processes.

As described above, a POS terminal 9 (control device) according to this embodiment has a control device controller 40 including a log compiler 402 configured to generate log data D1 including status information indicating the status of monitored items of which the state is monitored; a communication manager 403 configured to send the log data D1 the log compiler 402 generated as a request to a maintenance server 7 (server), and receive as a response from the maintenance server 7 control data (response data D2) specifying executing a specific process at a specific time; a communication manager 403 configured to send the log data D1 the log compiler 402 generated as a request to a maintenance server 7 (server), and receive as a response from the maintenance server 7 control data (response data D2) specifying executing a specific process at a scheduled time; a time monitor 4041 that monitors if the current time has reached the scheduled time; and a command executor 4042 that executes the specific process if the current time has reached the scheduled time.

Thus comprised, the POS terminal 9, based on the response data D2 received from the maintenance server 7, executes, by functions of the time monitor 4041 and command executor 4042, a specific process when the current time reaches the scheduled time. As a result, the POS terminal 9 can execute a specific process at a specific time as instructed by the maintenance server 7.

When the command executor 4042 executes the specific process, the log compiler 402 of the control device controller 40 in this embodiment generates log data D1 including information indicating the process result.

By transmitting the log data D1 when the specific process is executed at the scheduled time, the POS terminal 9 sends the process result to the maintenance server 7.

The maintenance server 7 according to this embodiment has a maintenance server controller 20 including a request receiver 201 configured to receive, as a request, log data D1, which the POS terminal 9 generates and sends, including status information indicating the status of monitored items of which the state is monitored; a response transmitter 202 configured to send, to the POS terminal 9, as a response to the request, control data (response data D2) including the scheduled time for the POS terminal 9 to execute a specific process; and a setting unit 205 configured to set the scheduled time.

The maintenance server 7 can thus send to the POS terminal 9 response data D2 as a response to the log data D1, and can cause the POS terminal 9 to execute a specific process at a specific time.

The setting unit 205 of the maintenance server controller 20 in this embodiment provides a command input screen G111 (user interface) for accepting input of information related to the scheduled time, and information related to the specific process, and can set the scheduled time based on input to the command input screen G111.

The user can therefore use the command input screen G111 to easily set the scheduled time.

The setting unit 205 of the maintenance server controller 20 in this embodiment, based on a time (Local Time) input to the command input screen G111, sets a scheduled time reflecting the time difference between the location of the POS terminal 9 and the location where data is input to the command input screen G111.

The user can therefore easily set, by the setting unit 205, an appropriate scheduled time reflecting this time difference even if the time difference between the location of the POS terminal 9 and the location where data is input to the command input screen G111 is not known.

The setting unit 205 in this embodiment of the invention receives from the POS terminal 9 log data D1 including information indicating the process result of the specific process, and based on information contained in the received log data D1, manages the progress of the specific process.

The maintenance server 7 can therefore manage the progress of the POS terminal 9 executing a specific process based on the log data D1 received from the POS terminal 9.

The invention is described above with reference to a preferred embodiment thereof, but the invention is not limited thereto and can be modified and adapted in many ways without departing from the scope of the accompanying claims.

For example, when the control method of the POS terminal 9 (control method of a control device) described above is implemented by a computer of the POS terminal 9, or by an external device connected to the POS terminal 9, the invention can be embodied by a program the computer executes to implement the method, by a recording medium recording the program readably by a computer, or a communication medium for transmitting the program. Examples of such recording media include magnetic and optical recording media, and semiconductor memory devices. More specifically, removable or fixed storage media may be used, including floppy disks, hard disk drives (HDD), CD-ROM (Compact Disk Read Only Memory), DVD (Digital Versatile Disk), Blu-Ray® Discs, magneto-optical discs, flash memory, and memory card media. The recording media may also be RAM (random access memory), ROM (read-only memory), or a hard disk drive or other nonvolatile memory used as internal storage of a device in the POS terminal 9 or an external device connected to a device in the POS terminal 9.

The invention is described above using the store system 3 deployed in a store, but the facilities in which the store system 3 is deployed are not limited to stores.

Communication between devices in the network system 1 may also be by any desirable means.

The POS terminal 9 in the foregoing embodiment is described using a thermal recording method, but the recording method is not so limited.

Function blocks in the foregoing embodiments may also be embodied as desired by the cooperation of hardware and software, and do not suggest a specific hardware configuration.

What is claimed is:

1. A control device for connecting to and being controlled by a server, and comprises:
   at least one memory; and
   a processor communicatively coupled to the at least one memory, the processor being configured to:
   generate log data containing a status of a monitored item;
   store the generated log data in the at least one memory;
   send the generated log data as a request to the server;
   receive as a response to the request control data instructing executing a specific process at a scheduled time set by the server, from the server; and
   execute the specific process when the current time has reached the scheduled time, according to the control data received from the server
   wherein the specific process is not a process of transmitting the log data to the server.

2. The control device described in claim 1, wherein the processor is further configured to:
   generate the log data including information indicating a process result when the command executor executes the specific process.

3. A control method of a control device for connecting to and being controlled by a server, comprising:
   generating log data containing a status of a monitored item;
   sending the log data as a request to the server;
   receiving as a response to the request, control data instructing executing a specific process at a scheduled time set by the server, from the server; and
   executing the specific process when the current time has reached the scheduled time
   wherein the specific process is not a process of transmitting the log data to the server.

4. A server for connecting to and controlling a control device, and comprises:
   at least one memory; and
   a processor communicatively coupled to the at least one memory, the processor being configured to:
   receive, as a request from the control device, log data containing a status of a monitored item;
   set a scheduled time at which to execute a specific process; and send as a response to the request, control data instructing the control device to execute the specific process at the scheduled time, to the control device,
wherein the specific process is not a process of the control device transmitting the control data to the server.

5. The server described in claim 4, wherein the processor is further configured to:
set the scheduled time based on input to a user interface that receives input of information related to the scheduled time and information related to the specific process.

6. The server described in claim 5, wherein:
information related to the scheduled time includes information indicating the time zone of the location where information is input to the user interface; and
the scheduled time is set based on the time zone information input to the user interface, to reflect the time difference between the location of the control device and the location where information is input to the user interface.

7. The server described in claim 4, wherein the processor is further configured to:
receive the log data containing information indicating a process result of the specific process from the control device, and manage the state of progress of the specific process based on information contained in the received log data.

8. A network system including a control device, and a server that connects to and controls the control device;
the control device including:
at least one memory; and
a processor communicatively coupled to the at least one memory, the processor being configured to:
generate log data containing a status of a monitored item;
store the generated log data in the at least one memory;
send the generated log data as a request to the server;
receive as a response to the request, control data instructing executing a specific process at a scheduled time set by the server, from the server; and
execute the specific process when the current time has reached the scheduled time,
wherein the specific process is not a process of transmitting the log data to the server; and
the server including:
at least one memory; and
a processor communicatively coupled to the at least one memory, the processor being configured to:
receive the log data as a request from the control device;
set the scheduled time; and
send the control data to the control device as a response to the request.

9. The network system described in claim 8, wherein the processor of the control device is further configured to generate the log data including information indicating a process result when the command executor has executed the specific process.

10. The network system described in claim 9, wherein the processor of the server is further configured to:
receive the log data containing information indicating a process result of the specific process from the control device, and manage the state of progress of the specific process based on information contained in the received log data.

11. The network system described in claim 8, wherein the processor of the server is further configured to set the scheduled time based on input to a user interface that receives input of information related to the scheduled time and information related to the specific process.

12. The network system described in claim 11, wherein:
information related to the scheduled time includes information indicating the time zone of the location where information is input to the user interface; and
wherein the processor of the server is further configured to set the scheduled time, based on the time zone information input to the user interface, to reflect the time difference between the location of the control device and the location where information is input to the user interface.

13. A control method of a network system including a control device, and a server that connects to and controls the control device;
the control device having a processor configured to:
generate log data containing a status of a monitored item;
send the generated log data as a request to the server;
receive as a response to the request, control data instructing executing a specific process at a scheduled time set by the server, from the server, and
execute the specific process when the current time has reached the scheduled time,
wherein the specific process is not a process of transmitting the log data to the server; and
the server having a processor configured to:
receive the log data as a request from the control device; and
send the control data to the control device as a response to the request.

* * * * *